Sept. 7, 1965   H. K. GILLMAN   3,204,676
APPARATUS FOR STACKING AND WEIGHING SLICED FOOD PRODUCTS
Filed Aug. 11, 1961   19 Sheets-Sheet 1
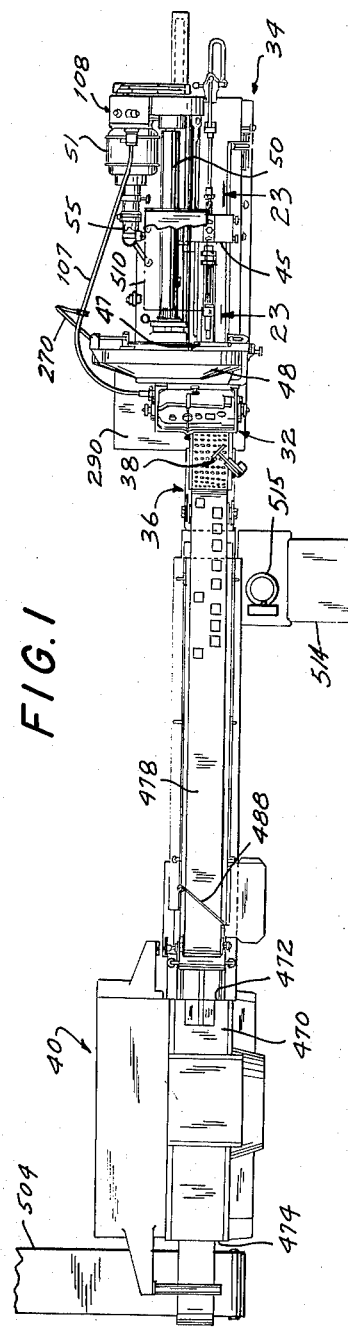
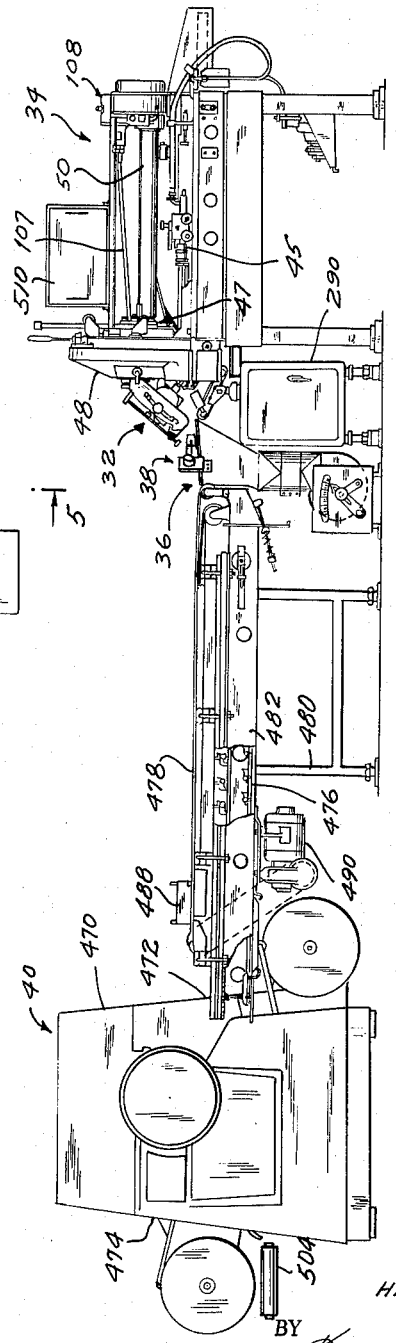
INVENTOR.
HAROLD K. GILLMAN
BY Kane, Dalsimer & Kane
ATTORNEYS

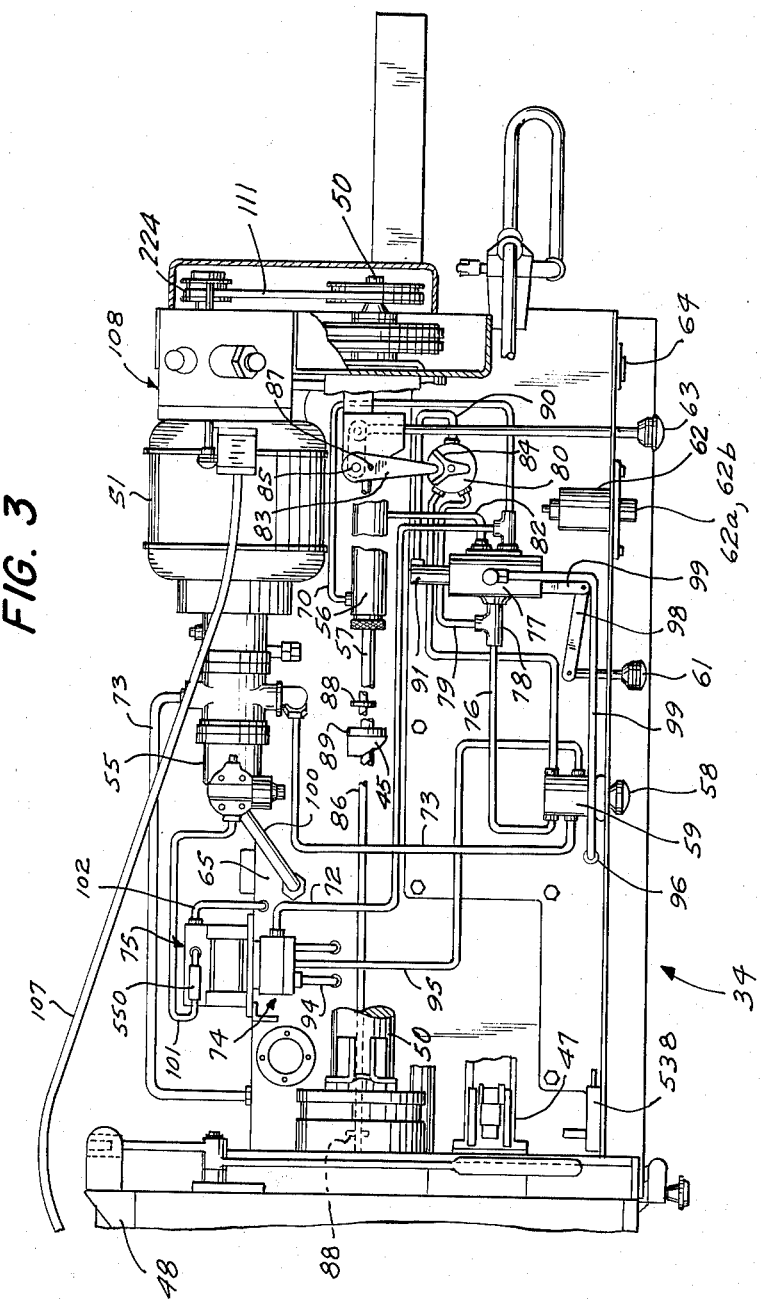

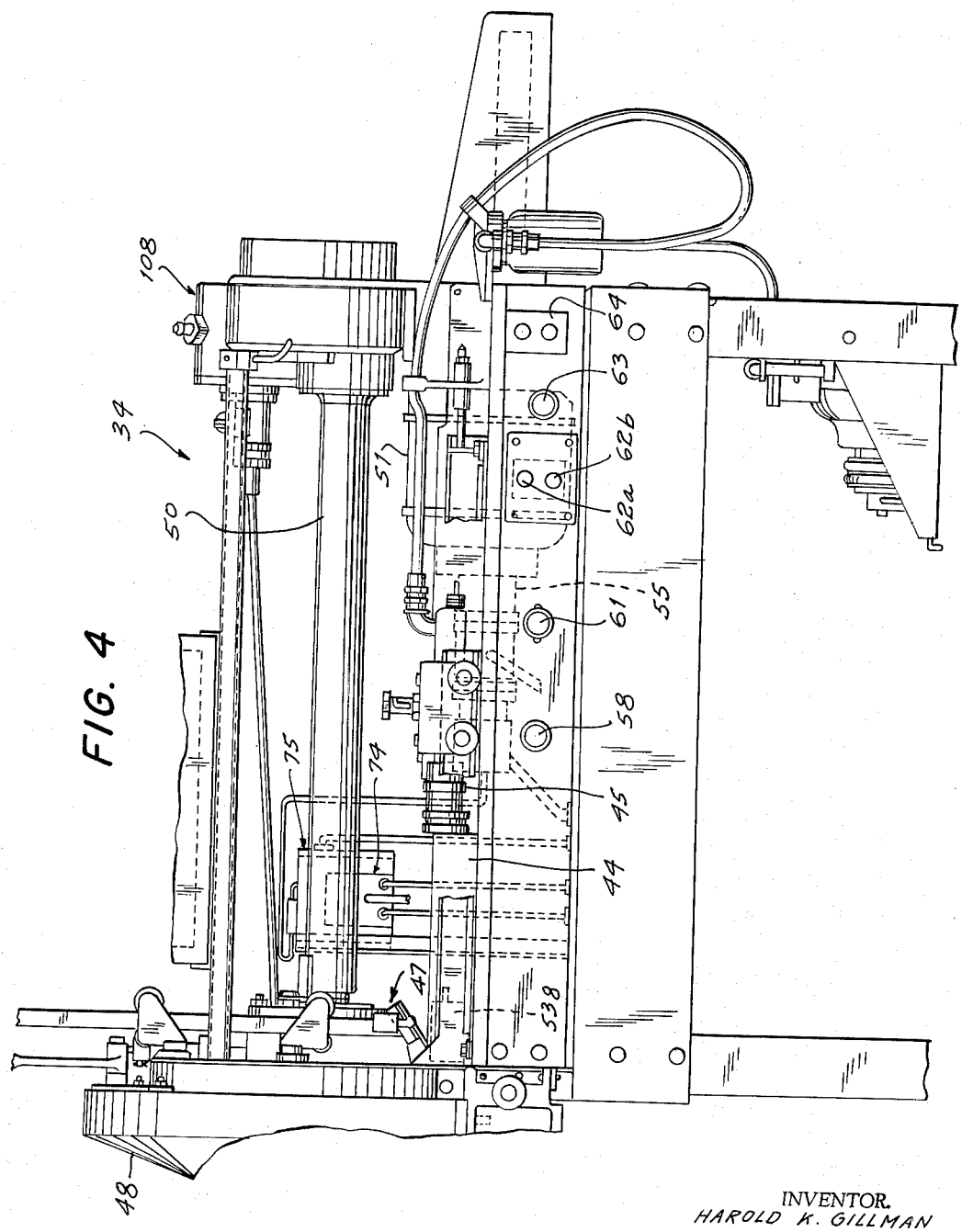

Sept. 7, 1965  H. K. GILLMAN  3,204,676
APPARATUS FOR STACKING AND WEIGHING SLICED FOOD PRODUCTS
Filed Aug. 11, 1961  19 Sheets-Sheet 4

INVENTOR.
HAROLD K. GILLMAN
BY Kane, Dalsimer & Kane
ATTORNEYS

Sept. 7, 1965　　　　　　H. K. GILLMAN　　　　　　3,204,676
APPARATUS FOR STACKING AND WEIGHING SLICED FOOD PRODUCTS
Filed Aug. 11, 1961　　　　　　　　　　　　　　　19 Sheets-Sheet 5
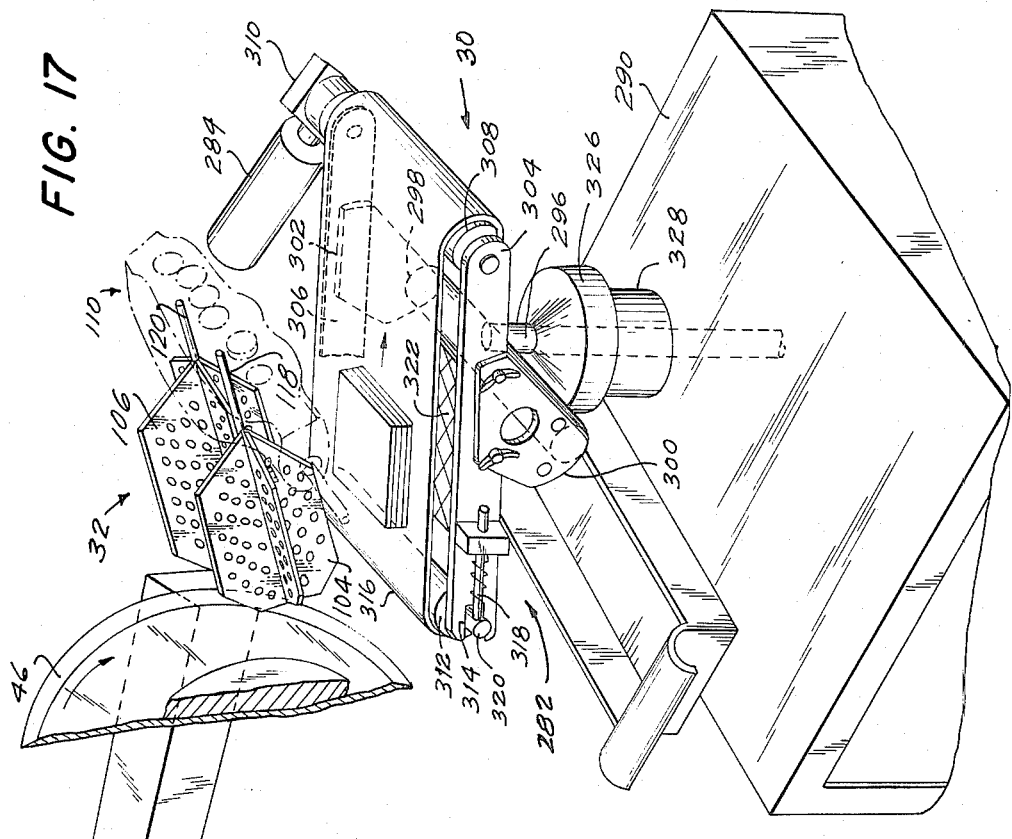
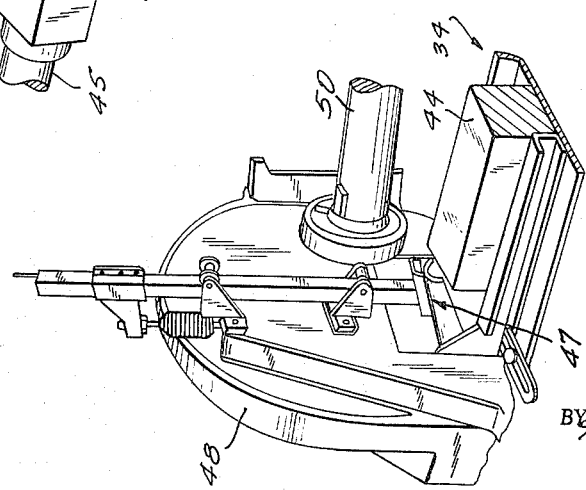
INVENTOR.
HAROLD K. GILLMAN
BY Kane, Dalsimer & Kane
ATTORNEYS Sept. 7, 1965　　　　　　　H. K. GILLMAN　　　　　　　3,204,676
APPARATUS FOR STACKING AND WEIGHING SLICED FOOD PRODUCTS
Filed Aug. 11, 1961　　　　　　　　　　　　　　　19 Sheets-Sheet 6
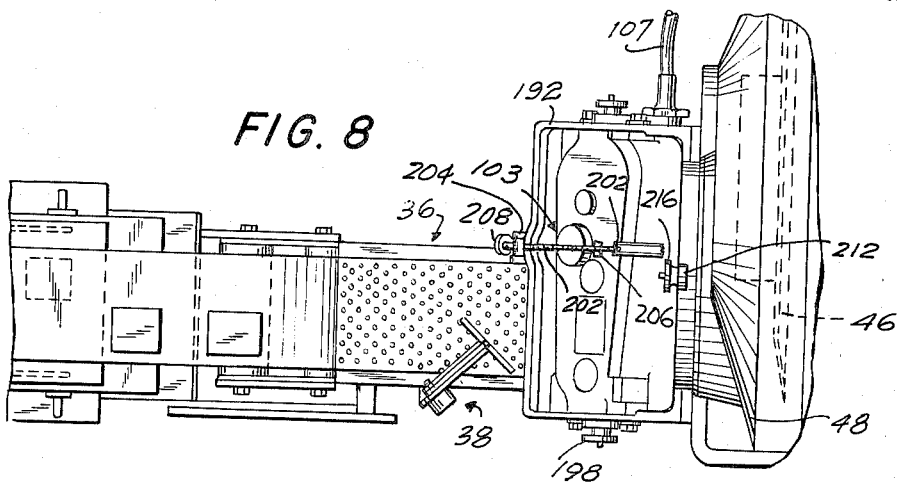
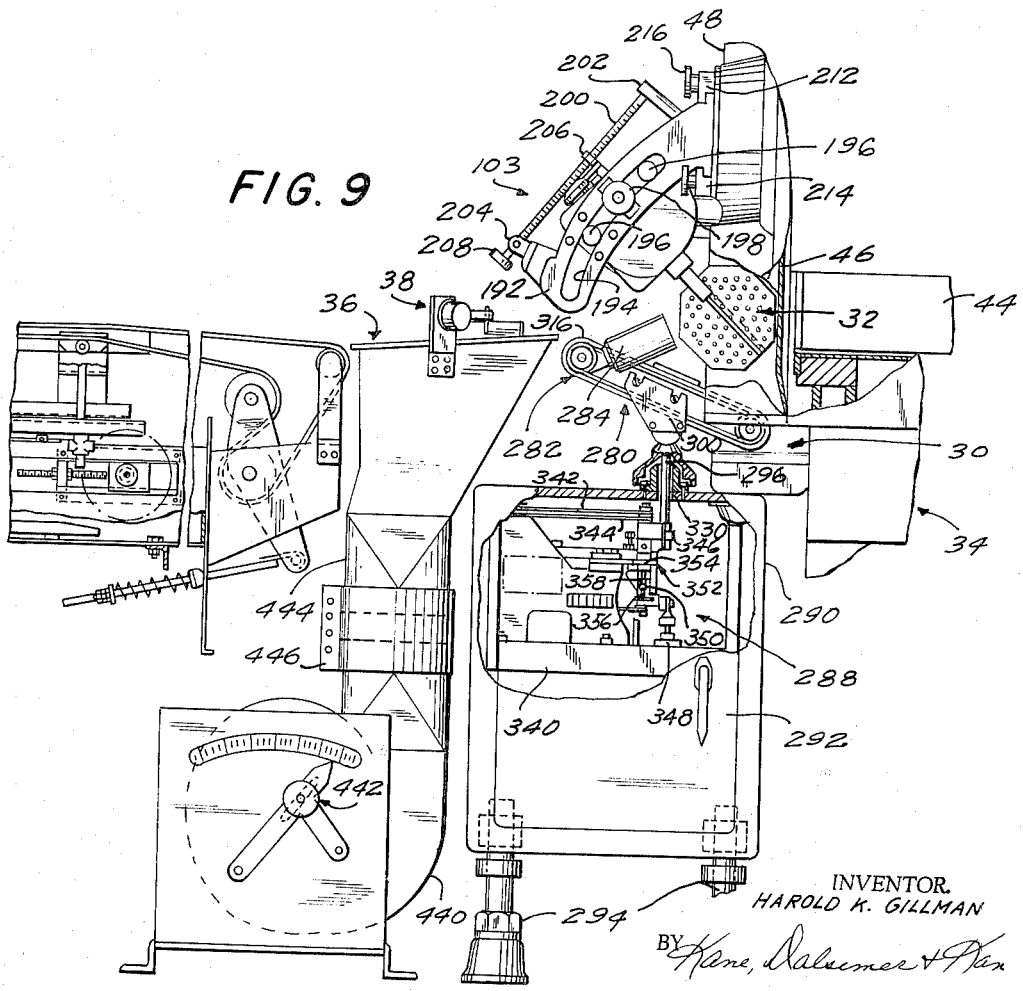
INVENTOR.
HAROLD K. GILLMAN
ATTORNEYS

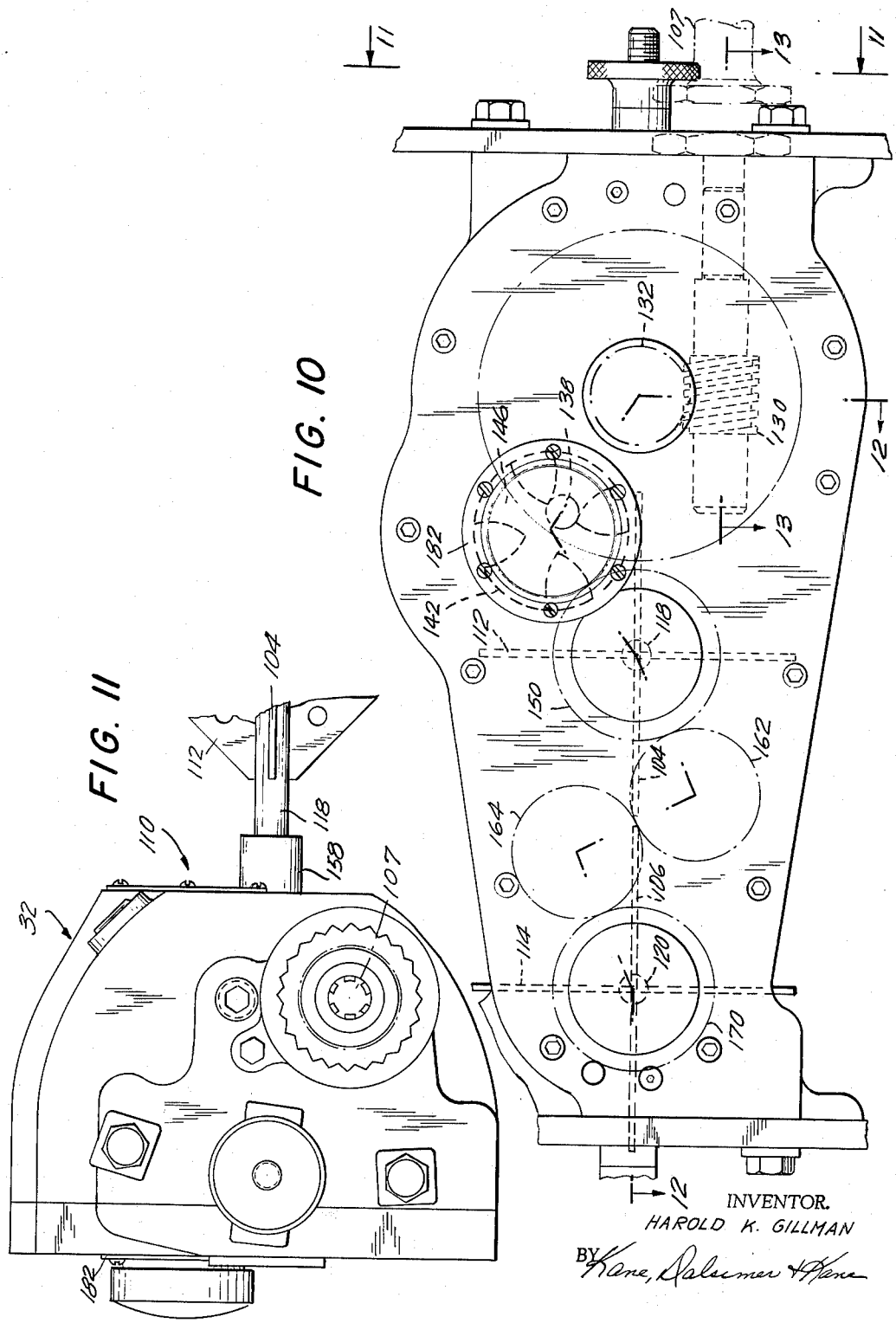

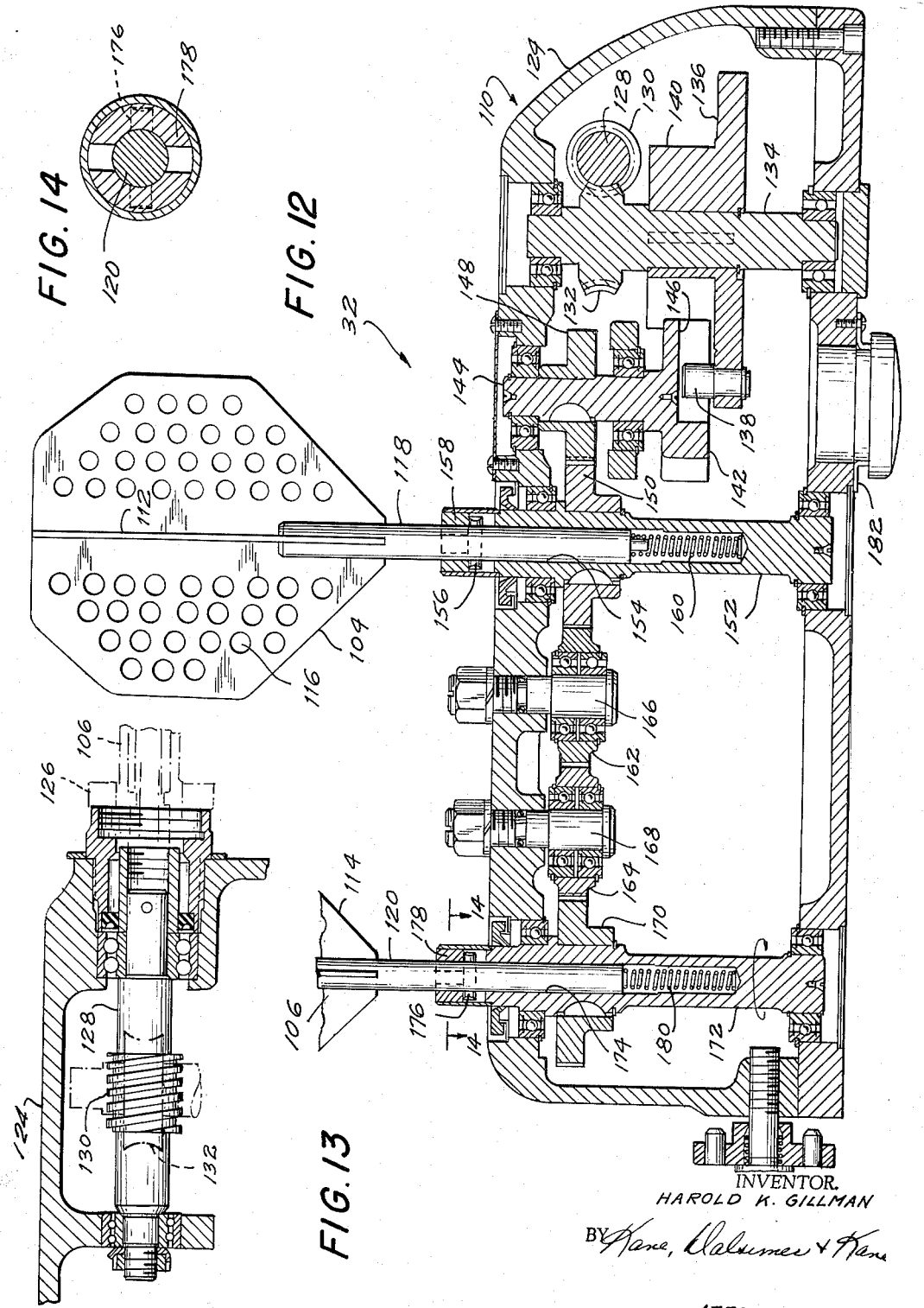

Sept. 7, 1965  H. K. GILLMAN  3,204,676
APPARATUS FOR STACKING AND WEIGHING SLICED FOOD PRODUCTS
Filed Aug. 11, 1961  19 Sheets-Sheet 9

INVENTOR.
HAROLD K. GILLMAN
BY Kane, Dalsimer & Kane
ATTORNEYS

Sept. 7, 1965  H. K. GILLMAN  3,204,676
APPARATUS FOR STACKING AND WEIGHING SLICED FOOD PRODUCTS
Filed Aug. 11, 1961  19 Sheets-Sheet 10

INVENTOR.
HAROLD K. GILLMAN
BY Kane, Dalsimer & Kane
ATTORNEYS

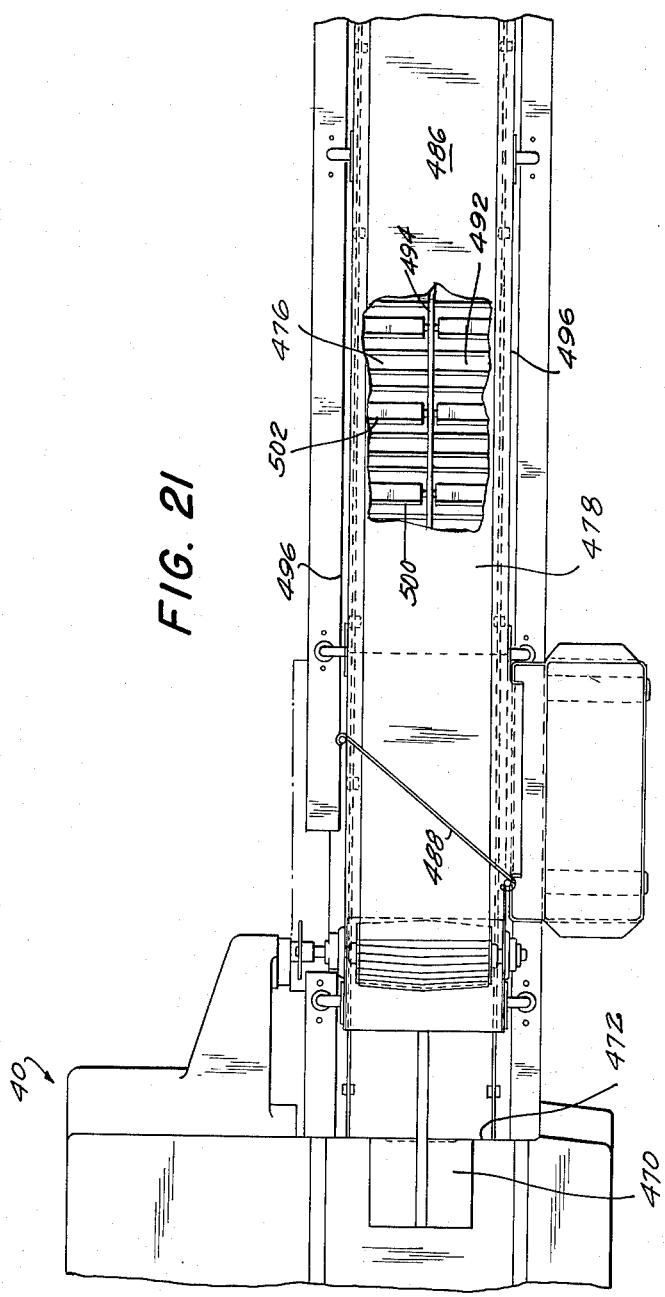

Sept. 7, 1965  H. K. GILLMAN  3,204,676
APPARATUS FOR STACKING AND WEIGHING SLICED FOOD PRODUCTS
Filed Aug. 11, 1961  19 Sheets-Sheet 12

FIG. 22

INVENTOR.
HAROLD K. GILLMAN
BY
ATTORNEYS

Sept. 7, 1965 H. K. GILLMAN 3,204,676
APPARATUS FOR STACKING AND WEIGHING SLICED FOOD PRODUCTS
Filed Aug. 11, 1961 19 Sheets-Sheet 13

INVENTOR.
HAROLD K. GILLMAN
BY
ATTORNEYS

INVENTOR.
HAROLD K. GILLMAN

ATTORNEYS

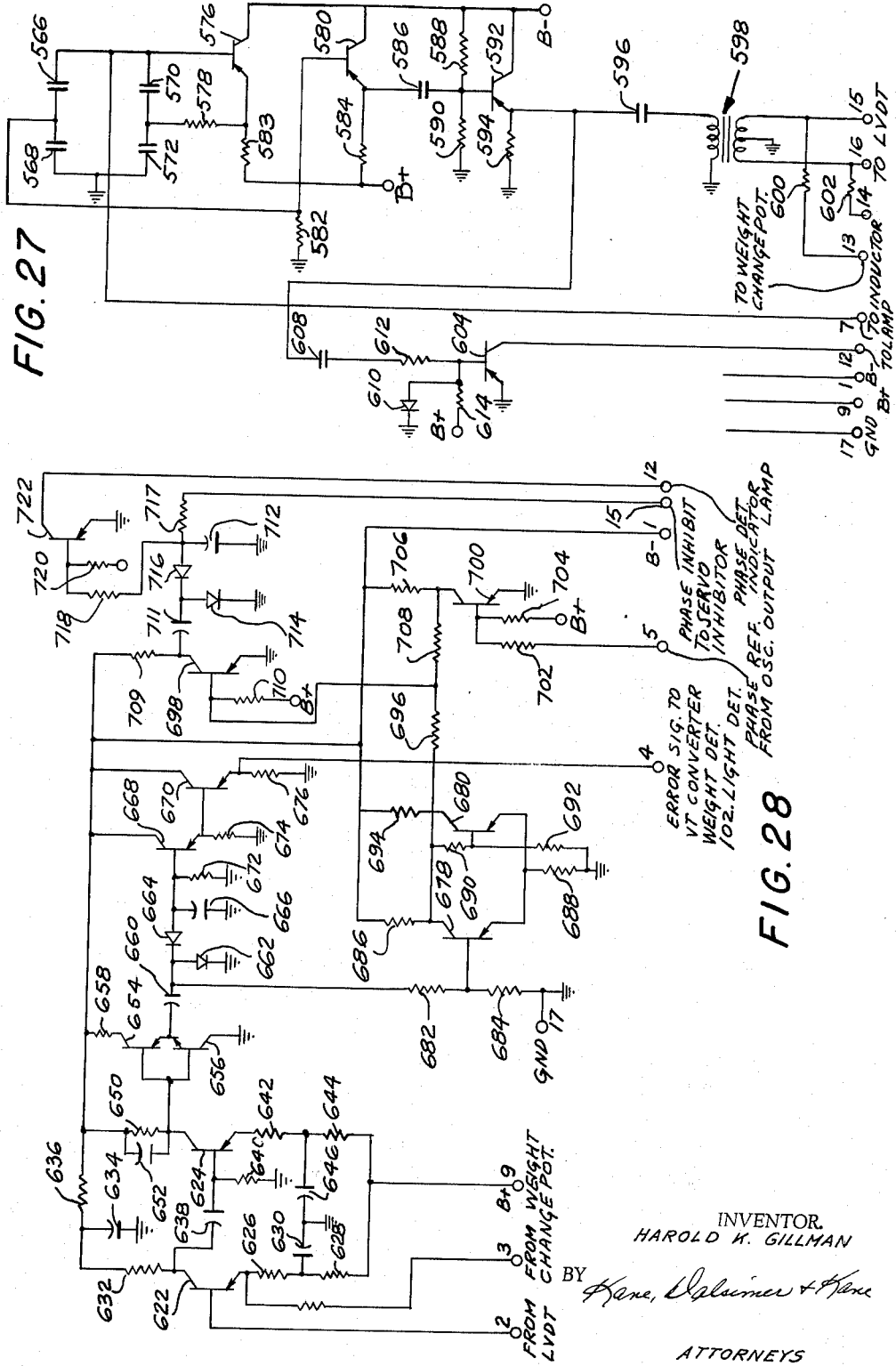

Sept. 7, 1965  H. K. GILLMAN  3,204,676
APPARATUS FOR STACKING AND WEIGHING SLICED FOOD PRODUCTS
Filed Aug. 11, 1961  19 Sheets-Sheet 17

INVENTOR.
HAROLD K. GILLMAN
BY
ATTORNEYS

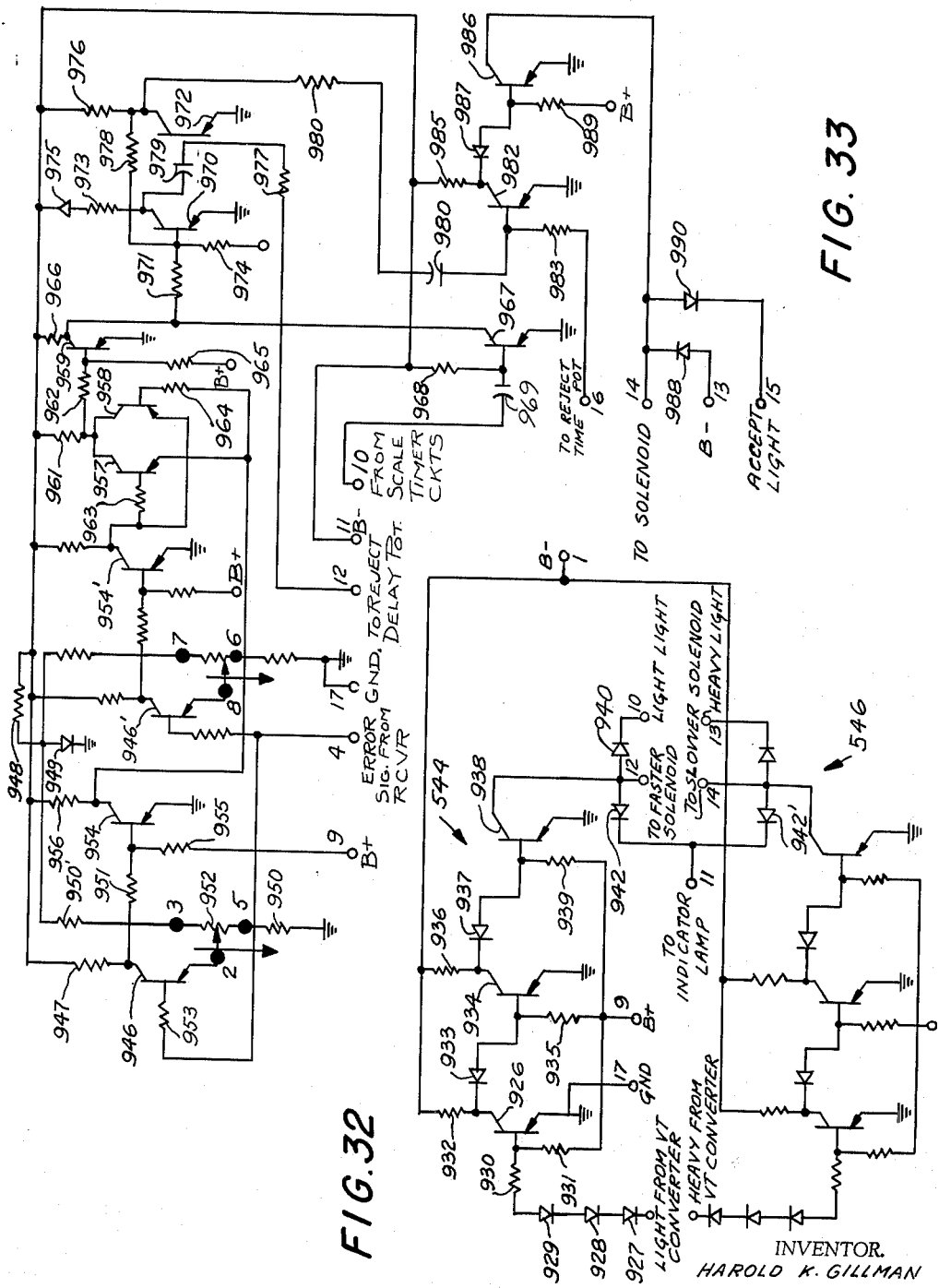

INVENTOR.
HAROLD K. GILLMAN

ATTORNEYS

United States Patent Office 3,204,676
Patented Sept. 7, 1965

3,204,676
APPARATUS FOR STACKING AND WEIGHING SLICED FOOD PRODUCTS
Harold K. Gillman, Albany, N.Y., assignor, by mesne assignments, to Unexcelled Chemical Corp., New York, N.Y., a corporation of New York
Filed Aug. 11, 1961, Ser. No. 130,982
6 Claims. (Cl. 146—94)

This invention relates to apparatus for stacking and weighing sliced food products and more particularly to improved apparatus for stacking sliced cold cuts coming from a slicing machine and controlling the weight of the stacks thus produced.

In the preparation of sliced cold cuts it has been common practice in the commercial meat packing field to operate a slicing machine to either continuously or intermittently feed the product to be sliced into the slicing knife. An initial determination is made of the number of slices to be included in the particular package possessing a certain weight so that a definite thickness can be selected for a slice. The slices are then severed from the product body or loaf in accordance with the selected thickness and then dropped onto a continuously moving conveyor or platform which respectively arranges the slices in either shingle or stacked condition. Beyond this initial station, the shingled or stacked slices, as the case may be, were transferred to a station at which a number of scales were located, which in some cases totalled six. The several operators located at this point, segregated the sliced product for packaging into separate measured quantities of predetermined weight. These operators would ordinarily have available, slices or fractions of a slice, which would be added to a particular group of slices if of insufficient weight to meet the preset standard. Since the weight of the segregated groups or quantities must be held within close tolerance, the work of accurately measuring and separating the precise quantities was tedious and time consuming and accordingly, costly.

The feeding mechanism which supplies the product to be sliced by the slicing machine blade would have its speed increased or decreased, depending upon the thickness desired. The knife or blade usually operated continuously at the same given speed so that the faster the substance or product moved toward the knife, the greater would be the thickness of the slices and vice versa. In order to group the slices so that each group contains a predetermined rate, either the number of slices would have to be changed or the slice thickness for a given number of slices in a group, by the operator in attendance. In most instances, these changes would be required often and even constantly if the preset standard was to be met and the weight of the group held within close tolerance; and the operator would then be required to mentally retain the number of slices cut and subsequently, either manually change the number or their thickness.

In the present commercial field of slicing cold cuts, six to ten slices are ordinarily packed in an overwrapped film of Saran, cellophane or in a vacuum-type of film. It was inevitably always necessary for a certain number of the crew, termed scalers, operating the particular cold cut line, to hand-weigh the product to maintain the weight that was selected and described on the package label, which would, for example, be six, eight, twelve or sixteen ounces. At the same time, it was necessary for these scalers to keep the give-away at a minimum. This, however, is extremely difficult to accomplish effectively and efficiently while simultaneously maintaining optimum production. Therefore, in the industry, a 3½ to 5 percent give-away prevails. Unfortunately, it is difficult in such cold cut operational lines to maintain a low labor cost because of the slow speed operation, especially as the process must necessarily be handled.

For instance, in one of these operational lines, having four slicers in a row, an individual slicer possesses a top production speed of 100 slices of product per minute; and for each slicer, one scaler is required to check-weigh each group of cold cuts sliced in six ounce or larger weight packages. With this particular commercial method, it is only possible to get production of about 106 pounds of sliced product per hour per crew operator. In this connection, in a complete line having four slicers in a row, the crew or gang line-up would include one foreman, one feeder who would ordinarily service the four slicers, four scalers, one attendant for the particular wrapping machine or package closer, a pair of packers and box-makers. The expected total production per hour would be about 954 pounds when a six ounce package was run. The average give-away per package, utilizing this method, would be about 3½ percent.

Most slicing apparatus used on cold cut products, such as sausage products, run at a relatively low slicing speed. Therefore, production per slicer is low, usually about 250 pounds per slicer per hour. Maintenance and repairs for these slow speed slicers are extremely high. To do a respectable job of slicing and stacking, the slicer requires an overhaul at least once a year and constant attention during the year. To meet output demands, several slicers would be required to be placed on the floor, thereby increasing the floor space requirements.

It should be understood that there are ever-changing parameters with respect to the particular loaf to be sliced, whether it be round or square in cross-section. For example the cross-section, density, homogenity, together with other factors such as progressive or unexpected changes in the relative proportionment of loaf ingredients which may also vary with temperature conditions, would not be constant or controllable; and experience has proven that these variables should be expected. It should be thus readily apparent from the above that prior commercial cold cut lines simply could not maintain give-away costs at a minimum and simultaneously keep operational packaging speeds at a maximum.

It is therefore one of the principal objects of the present invention to eliminate the drawbacks and disadvantages inherent in these prior operational cold cut lines, by providing a system for automatically stacking and weighing sliced cold cuts while conveying, wherein the cost of packaging and labor is reduced; maintenance costs are reduced to and kept at an absolute minimum; and in addition, such apparatus employing a superior slicer having optimum output the equivalent of six or more slow speed slicers; and apparatus having a much lower unit cost for equivalent production compared to other commercial cold cut lines; a cold cut line demanding control of only one slicer instead of several to satisfy a particular output demand; and a cold cut line drastically reducing floor space requirements, significantly increasing the output or production per unit time per cold cut line and minimizing give-away with substantially no underweights.

The present invention contemplates an apparatus for stacking and weighing-while-conveying slices of cold cuts coming from the discharge end of the slicing machine. The apparatus is initially set to receive a certain number or count of slices, the stacks of which are adapted to be transported through a weighing station. An operative interconnection is provided between this station and the feed control of the slicing machine to correct the slice thickness of the package if underweight or overweight.

Thus, a stacker is set for six, eight or ten slices, as desired, for purposes of receiving the selected number coming from discharge end of the slicing machine and places the stacked product on a moving weighing belt at the weighing station. The scale at this station is set for the desired weight, and a certain weight tolerance. The weight of the group of sliced products is automatically registered thereby; and if more than the preset tolerance, the group will be rejected from the line. At this instant, a signal is fed back to the feed control of the slicing machine to alter the thickness of slice in part of the next group. As long as the scale registers zero correction, the feed control will not change. If there is a variance, the control modulates to maintain a fixed given weight for each stacked group.

Any group not within the set tolerance therefore is rejected on the takeaway conveyor. In this connection, the first one or two groups from product stuffed in round casings, or product which is irregular on either end of the loaf, is ordinarily automatically rejected. Along the takeaway conveyor, a scaler is advantageously located to work on the rejected stacks to attain the desired weight and places them on the conveyor line to the packaging location. Since a minimum of rejects are anticipated, this operator also assists in feeding the proper weight stacks to the packaging location. Sophisticated electronic circuitry, which includes printed circuit cards, form part of the apparatus and facilitate maintenance and repairs, as well as a determination of the exact nature of trouble if it is to occur as a result of mistreatment, etc., in a packing plant in the course of clean-up, etc.

Other objects and advantages will become apparent from the following detailed description of a somewhat preferred embodiment of the invention which is to be taken in conjunction with the accompanying drawings in which:

FIG. 1 is a top plan view, partially schematic, of a cold cut line in accordance with the teachings of the present invention, having apparatus for stacking and weighing while conveying sliced food products coming from a slicing machine and transferring the stacked groups, of the desired weight, to the particular packaging station, and rejecting those not within a preset tolerance.

FIG. 2 is a side elevational view of this cold cut line with certain parts removed and broken away for purposes of clarity of illustration.

FIG. 3 is an enlarged fragmentary plan view of the slicing machine showing the hydraulic controls.

FIG. 4 is a fragmentary side elevational view of the slicing machine.

FIG. 7 is a fragmentary perspective view of that part of the slicing machine at the rear of the knife blade.

FIG. 8 is a fragmentary top plan view illustrating the stacker and air conveyor as well as adjacent portions of the slicing machine and packaging conveyor.

FIG. 9 is a fragmentary side elevational view of the apparatus of FIG. 8 illustrating the stacker, continuously driven weigh conveyor and supporting scale, and air conveyor with associated reject mechanism.

FIG. 10 is an enlarged elevational view of the paddle box of the stacker employed in the present invention with certain parts broken away and others illustrated in phantom.

FIG. 11 is an end view of the stacker paddle box, illustrating a paddle fragmentarily, taken along the line 11—11 of FIG. 10.

FIG. 12 is a sectional view of the paddle box taken along the line 12—12 of FIG. 10 with certain parts broken away and removed.

FIG. 13 is a fragmentary sectional view taken along the line 13—13 of FIG. 10.

FIG. 14 is a cross sectional view taken along the line 14—14 of FIG. 12.

FIG. 17 is a perspective view of the weigh conveyor with parts of the slicing machine, stacker and scale shown fragmentarily.

FIG. 21 is a plan view of the packaging area with certain parts broken away and removed.

FIG. 22 is a side elevational view thereof with certain other parts broken away and removed.

FIG. 27 is the printed circuit for the oscillator card.

FIG. 28 is the printed circuit for the receiver and phase detector cards.

FIG. 32 is the printed circuit for the solenoid valve driver card.

FIG. 33 is the printed circuit for the reject circuits card.

Figure 5:
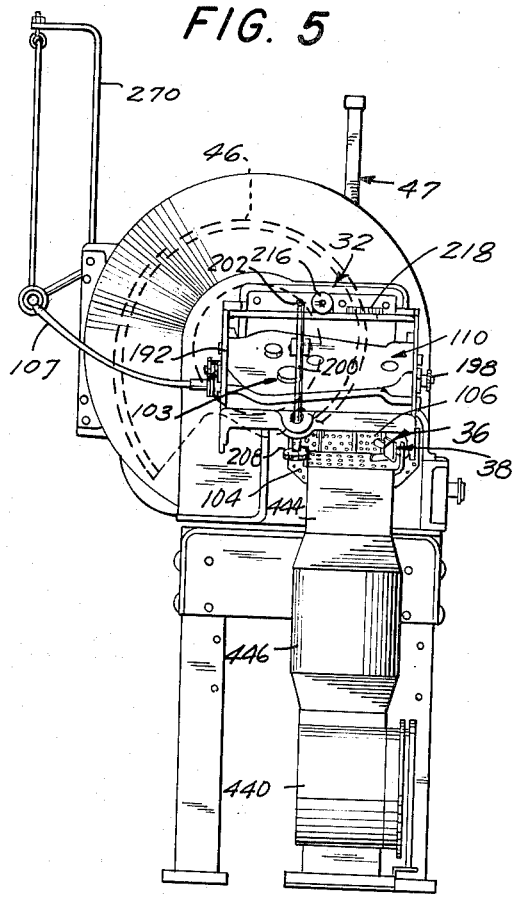
FIG. 5 is an end elevational view looking at the discharge end of the slicing machine and stacker as taken along the line 5—5 of FIG. 2.
Figure 6:
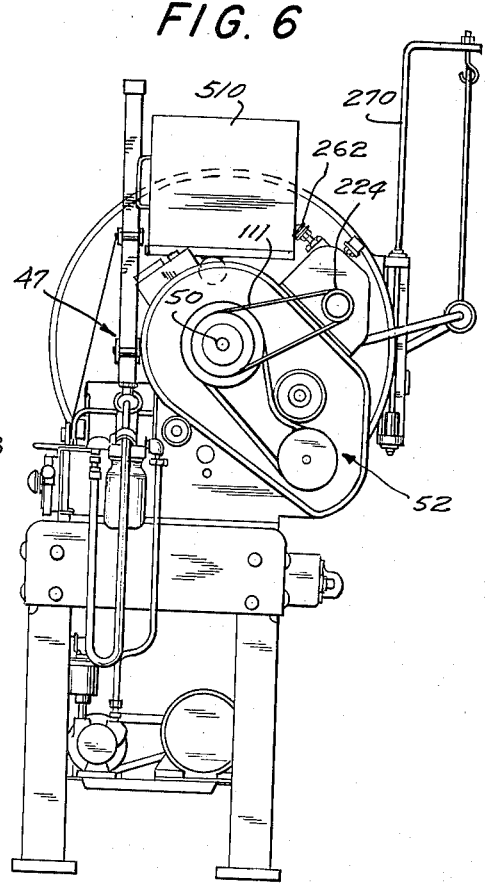
FIG. 6 is another end elevation, viewing the rear of the slicing machine.
Figure 19:
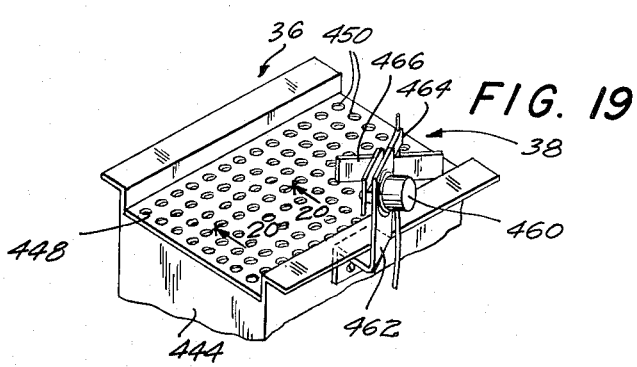
FIG. 19 is a fragmentary perspective view of the air conveyor employed for transferring the stacked groups of slices from the weighing belt to the take-away conveyor, as well as the reject mechanism for pushing those stacks out of line that are not within the preset weight requirements.
Figure 20:
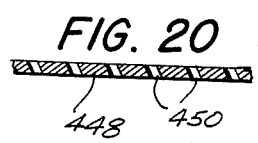
FIG. 20 is a cross sectional view taken along the line 20—20 of FIG. 19.
Figure 15:
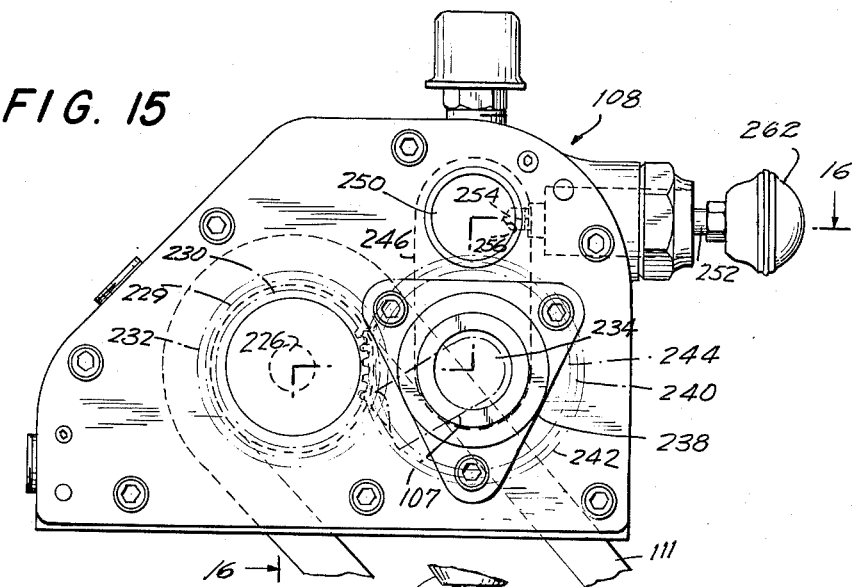
FIG. 15 is a side elevational view of the speed box for counting predetermined number of revolutions of the slicing machine blade, and in turn causing the paddles of the stacker to deposit the selected stacked group of slices onto the weigh conveyor.
Figure 16:
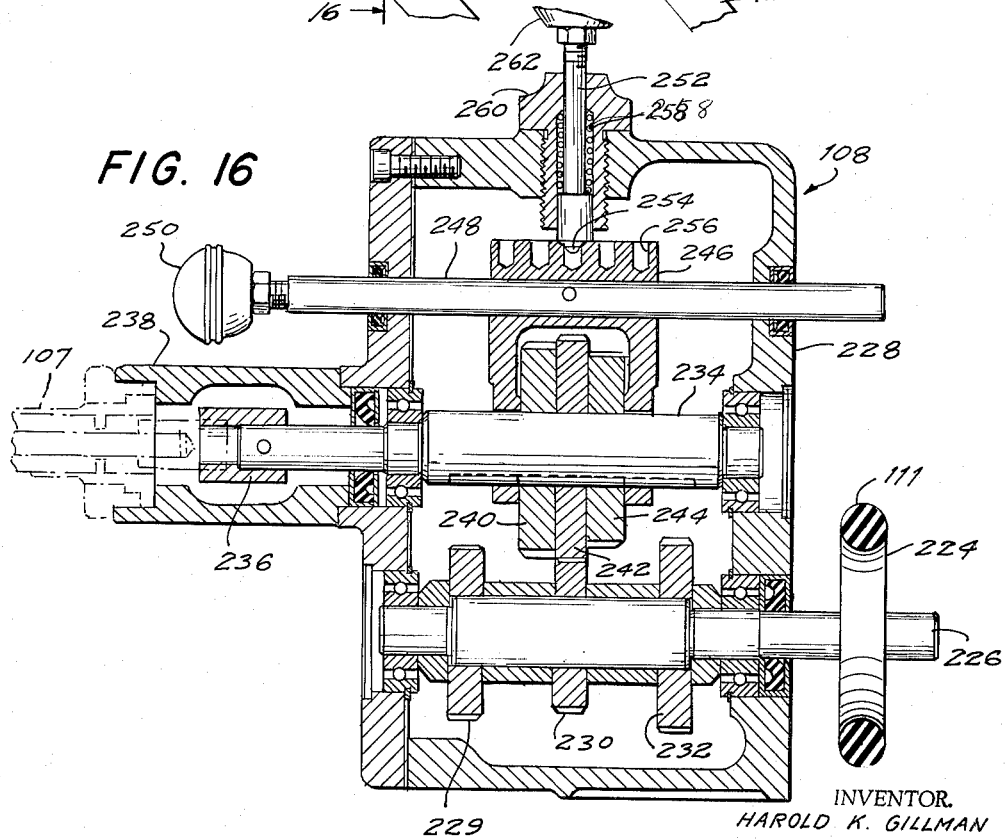
FIG. 16 is a sectional view of this speed box taken along the line 16—16 of FIG. 15 with certain parts broken away and removed.

In the accompanying drawings, the weighing while conveying apparatus 30 and stacker 32 are shown applied to the discharge end of a slicing machine 34, so that the sliced products from the slicing machine are discharged onto the stacker and from thence on to the weighing apparatus in accordance with the selected and established measure, whether it be six, eight or more slices per stacked group. The stacks are then weighed and segregated from the other slices coming from the slicing machine, as well as the stacks formed by the stacker 32. The stacks of sliced products are then transferred to further packaging stations by an air conveyor 36 if of prescribed weight, or on the other hand, to a reject station, at which point the proper weight is made, by a reject mechanism 38 if not within the preset tolerance. In this connection, the packaging station may adopt any one of a number of commercial wrapping or packaging apparatus or techniques, as for example, ordinary hand-wrapping Wrap-King Machiner, Cry-O-Vac, Automatic Wrapping Machines, or on the other hand, the illustrated Flex-Vac #612 Wrapping Machine, manufactured by the Standard Packing Corporation, New York, New York, using Saran, cellophane or other types of film.

Slicing machine

My invention may utilize the several different types of slicing machines presently existing on the market. The drawings illustrate one type of slicing machine 34 to which my invention is particularly applicable. However, it should be understood that the illustrated slicing machine does not per se constitute the present invention.

The illustrated slicing machine is available commercially under the name Anco #832 Cold Cut Slicer and is fully disclosed in the operating instructions for the Anco #832 Hydramatic Shear-Cut Slicer (dated September 17 1959), published by the manufacturer, The Allbright-Nell Co. of Chicago, Illinois, as well as commonly assigned U.S. patent application Serial No. 93,634 filed March 6, 1961, now U.S. Patent No. 3,099,304. The Anco #832 is a companion of the Anco #827 Hydramatic Bacon Slicer fully disclosed in the operating instructions for this machine (revised October 17, 1960), published by the same manufacturer, as well as in commonly assigned U.S. Patent Nos.: 2,812,792 granted November 12, 1957, 2,903,032 granted September 8, 1959, and 2,969,099 granted January 24, 1961. The relevant portions of the slicing machine 34 comprise a supporting table having a platen or feed bed over which the product, such as meat loaf, luncheon meat or other varieties of cold cuts shown at 44, is fed by a pusher or feeder 45 to the slicing blade 46 in order to be sliced and discharged onto the stacker 32, and eventually the weigh while convey apparatus 30. In this connection, pusher or feeder 45 may include one of many loaf gripping means disclosed in the operating instructions of the Anco #832 Slicer and as illustrated, this gripping means may assume the form of a vacuum gripper which through suction created by a suitable vacuum motor, is adapted to secure the loaf upon contact. The forward or leading edge of the meat product 44 is pressed downwardly against the bed so as to properly engage the blade 46 for slicing by means of a spring pressure plate or hold-down shoe 47 suitably supported adjacent the blade 46. The blade is encased in a housing 48 which serves to protect the operator and particularly the operator's fingers along with the shoe 47 on one side and the stacker 32 on the other; and in addition, this housing prevents the particles of sliced product from being thrown outwardly from the blade by centrifical force.

The blade or knife 46 is one conventional type of rotary cutter blade and is in the form of an eccentric disc or dished blade, which is adapted to be rotated at relatively high speeds. Although both types of knives perform satisfactorily the dished blade is somewhat preferred. The portion of the blade having the greatest radius serves to slice the leading edge of the product 44, while the portion of the blade having the minimum radius provides clearance for the product to be fed outwardly thereby permitting the initiation of the next slicing operation. The product 44 is continuously fed forwardly by the pusher 45 and each cycle of rotation of the blade produces another slice.

The speed of operation of slicer 34 can be set for 400 to 1160 r.p.m. with the adjustment being somewhat dependent upon stacker efficiency and the particular product 44 to be sliced. For most applications, it will be found that 650 and 800 r.p.m. or thereabouts is practical and satisfactory for superior product and proper stacker operation. Ordinarily, thick slices and colder products are cut at somewhat slower speeds.

The blade 46 is mounted at the end of a rotatable shaft 50, which is suitably journalled; and the shaft in turn may be driven by an electric motor 51 through suitable drive mechanism 52. A motor 51 also operates hydraulic pump 55 which provides the hydraulic fluid under pressure for the operation of the hydraulic mechanism. In this connection, the piston 57 is operatively connected to the pusher arm 45 so as to automatically feed the product 44 to be sliced towards the blade 46, and then automatically retracts the pusher arm after completion of the feed stroke.

When motor 51 is operated, it causes the rotation of the knife blade 46 and also the operation of the hydraulic pump 55 so as to generate the necessary hydraulic pressure for the operation of the remaining mechanism. The pusher arm 45 is caused to reciprocate by means of the handle 58 of the control valve 59. When the handle is pushed inwardly or depressed, it causes the initiation of operation or reciprocation of the pusher 45. When the handle is pushed outwardly or is retracted, it stops the reciprocation of the pusher 45.

Control lever 61, mounted on the side of the slicing machine 34, causes the rapid traverse or shifting of the pusher 45 in either direction. When the lever is in a neutral or center position, the pusher reciprocates normally. When it is desired to shift the pusher rapidly in a forward direction, one need only shift the lever forwardly towards the blade 46, and when it is desired to cause the pusher to shift in a rearward direction, the lever is shifted away from the blade.

A suitable manual feed control 62, comprising an increase button 62a and decrease button 62b, is also provided on the side of the slicing machine 34 for purposes of actuating the corrector of the flow control, both of which will be described in detail below. By depressing the increase button 62a for a duration of time, the speed of the pusher 45 correspondingly increases in a forward direction; and the depression of the decrease button 62b causes the speed of the pusher in a forward direction to be similarly decreased. Thus, a trained operator can make adjustments in the feed by merely pushing these buttons when changing from one product to another.

A lever 63 similarly mounted on the side of the slicing machine 34 causes the pusher 45 to start to feed the product 44 when completely loaded by merely manually releasing this lever by depressing it inwardly. A start-stop switch 64 determines the complete energization and stopping of the slicing machine 34.

Hydraulic circuits for the slicing machine

The hydraulic circuits for causing a reciprocation of the piston 57 and cylinder 56 and whereby the various controls 58, 61 and 62 are caused to operate are shown in FIG. 5. Thus, the hydraulic pump 55 pumps the hydraulic fluid from the supply tank 65 through the main supply line 73. As mentioned in the foregoing, the movement of the pusher arm 45 is continuous in its feed of the product 44 to the slicing blade 46 thereby assuring uniform thickness of the slices. As will be appreciated, hydraulic fluid entering the control valve 59 through line 73 will flow outwardly through line 76 to the spring-centered reversing valve 77 when the handle 58 for the valve 59 is pushed inwardly to start the feeding cycle. In addition to flowing to the spring-centered reversing valve, oil from line 76 passes through couplings 78 and line 79 to pilot valve 80. Oil entering the reversing valve 77 may leave through line 70 to the forward end of cylinder 56 to cause the pusher 45 to retract away from the blade 46, or it may leave through line 82 so as to enter the rear of the cylinder 56 and thereby cause the pusher 45 to feed forwardly toward the cutting blade 46. In this connection, the oil from the forward part of cylinder 56 is permitted to leave through line 72 and then through a flow control valve 74 to be described in detail shortly.

The pilot valve 80 controls the reversing valve 77 so as to determine whether the hydraulic fluid will exit through line 72 or the line 82. The pilot valve 80 in turn is controlled by the reciprocation of the pusher 45. Thus, the lever arm 83 which controls the position of the pilot valve 80 through interengagement with the finger lever 84 is pivotally mounted to the frame at 85 and to the pilot control rod 86 at the point 87. The pilot rod 86 is longitudinally reciprocal and has a pair of adjustable collars 88 near the opposite limits of movement of the pusher 45 which are engaged by the arm 89 extending from the carriage of the pusher 45 so as to shift the pilot rod 86 in a direction of movement of the pusher 45. Thus, when the pusher 45 is shifted to the right, pilot rod 86 will shift to the right when arm 89 engages collar 88 thereby pushing the arm 83 to the right to rotate the pilot valve 80 clockwise as viewed in the figures, a predetermined amount. This position of the pilot valve 80 is also attained by depressing lever 63 which is suitably linked for such purpose to arm 83. When the pilot valve 80 is in this position, the hydraulic fluid coming through the line 79 is blocked by the pilot valve and cannot exit through the lines 90 to the control portion 91 of the reversing valve 77. Under those circumstances, the spring-centered reversing valve 77 is in its center position and causes the hydraulic fluid entering the reversing valve 77 to exit through the line 82 to the rear portion of the hydraulic cylinder 56 with the result that the piston 57 and consequently the pusher 45 are fed towards the cutting blade 46.

During the meat product slicing cycle, the pusher 45 will continue its movement toward the slicing blade 46 and cause the product 44 to be sliced with the hydraulic fluid in the forward part of the cylinder 56 exiting through line 72 and eventually through the control valve 74.

When the pusher 45 shifts to the desired forward limit of movement, arm 89 will engage the other collar 88 shifting the pilot rod 86 to the left with the result that arm 83 is pivoted to the left causing the pilot valve 80 to rotate counter-clockwise a predetermined amount. Under those circumstances, the pilot valve 80 is opened to permit flow of the hydraulic fluid under pressure through line 79, pilot valve 80 and line 90 to the control portion 91 of the reversing valve 77. The hydraulic pressure from the line 90, entering the control portion 91, shifts the control inwardly against the force exerted by a spring therein with the result that hydraulic fluid from the reversing valve exits through the line 70 to the forward end of the hydraulic cylinder 76 causing the piston 57 and pusher 45 to shift rearwardly away from the blade 46.

This cycle of operation, with automatic retraction of pusher 45, continues as long as control valve 59 remains open. The speed at which the pusher 45 shifts in a forward or feeding direction is controlled by the flow control valve 74, which in turn is adapted to be modified to correspondingly alter the hydraulic fluid flow pattern by the manual flow control assembly 62 and double solenoid actuated corrector 75. Thus, as the piston 57 in the cylinder 56 is shifted to the left, the hydraulic fluid in the forward part of the cylinder must exit through the line 70. Reversing valve 77 is so constructed that the fluid leaving the cylinder through line 70 cannot pass through the reversing valve when it is centered, but must flow through the line 72 to the flow control valve 74. Through suitable electronic control, to be described in the following, the size of a pressure balanced orifice opening in the control valve 74 can be increased or decreased so as to increase or decrease respectively the flow of hydraulic fluid outwardly through line 94 and eventually back to the supply tank 65. By enlarging this orifice opening it will be appreciated that the speed of the feed is increased. By decreasing the size of the opening the speed of the feed is decreased.

As will become apparent shortly, an operative interconnection is provided between the weigh while convey apparatus 30 and the control valve 74 through corrector 75, to regulate the size of this pressure balanced orifice opening in order that the speed of feed of the pusher 45 can be adjusted to correspondingly change the slice thickness and thereby maintain the weight of the stacked slices within the prescribed limits.

Control valve 59 is connected by a line 95 to the flow control valve 74. When the valve 59 is closed, fluid pressures permit it to flow through the line 95 so as to maintain a constant pressure in the valve 74 thereby preventing any lag or resultant increase in the size of the slices upon each reversal of movement of the pusher 45.

Flow control valve 74 does not serve to control the speed of the pusher 45 in a rearward direction. When piston 57 shifts in cylinder 56 to the right, as viewed in the figures, the hydraulic fluid to the right of the piston exits through line 82 and is permitted to flow through reversing valve 77 when the control has been shifted inwardly through fluid pressure 91 and the fluid flows outwardly to return to line 96 through which it reenters the reservoir or supply tank 65.

When control lever 61 is pivoted rearwardly through the action of the cranks 98 and 99, it causes reversing valve 77 to assume the same position as when fluid pressure is applied to the control portion 91. In other words, it causes fluid under pressure to pass through the reversing valve and thence through line 72, valve 74 and line 70 to the forward portion of the cylinder 56. The hydraulic fluid at the rear of the cylinder can leave through line 82 and thence pass through reversing valve 77 and through the line 96 to reservoir or supply tank 65.

When the control lever 61 is pivoted forwardly or to the left, as viewed in the figures, it causes the fluid under pressure to pass through reversing valve 77 and line 82 to the rear portion of the cylinder 56. The fluid returning from the forward portion of the cylinder 56 through the line 70 need not pass through the flow control valve 74, but can now pass through the reversing valve 77 through line 96 to the reservoir 65. This permits the pusher 45 to travel at a much greater rate of speed.

A relief line and valve 100 is provided between the hydraulic pump 55 and the supply tank 65 so as to prevent too much pressure from building up in the hydraulic system. The relief valve can be adjusted to the desired pressure, as for instance, 150 pounds.

The slicing machine 34 and the hydraulic control circuits therefor, as shown and described, are illustrative of the type of device to which my invention may be applied. As stated, the slicing machine 34 is commercially available and does not per se constitute my invention. It should be understood, however, that the modifications incident to the adaptation of flow control valve 74 to the existing hydraulics of the slicing machine does in fact constitute part of the present invention. In this connection, an oil line 101, at pump pressure, extends to flow control valve 74. Another line 102 extends from the valve 74 back into the supply tank 65. Both of these lines, through the four-way solenoid valve corrector 75, determine the orifice opening and consequently the rate of speed of pusher 45 in a manner to be described in detail shortly.

*Stacker*

The drawings illustrate one type of stacker 32, to which my invention is particularly applicable. However, it should be understood that the illustrated stacker does not per se constitute the present invention. The illustrated stacker is available commercially under the name Anco #834 Slice-Stacker and is disclosed in the operating instructions for the Anco #834 Slice-Stacker (dated September 17, 1959), published by the manufacturer, the Allbright-Nell Co. of Chicago, Illinois.

With the foregoing in mind, it will become evident that the stacker 32 is driven in timed relationship by the knife shaft 50 of the slicer 34, and receives slices of the food product 44, collects them in a stack, and after the blade has cut the last slice, deposits the stack on the weigh-while-convey apparatus 30. Of importance is the fact that the slicer hydraulic feeding mechanism and product flow is not interrupted, thereby positively maintaining uniform slice thickness and consequently attaining optimum weight control.

The stacker 32 includes a Geneva transmission paddle box 110, mounted by a quadrant bracket 103 to the slicer knife guard 48. Extending from the paddle box 110 is a pair of paddles 104 and 106 which are ordinarily disposed in slice receiving position below the slicing blade 46. When the preselected number of slices of food product 44 have been stacked on these paddles, a flexible drive shaft 107 will initiate the actuation of the paddles to deposit the stacks on the weigh-while-convey apparatus 30. This shaft 107 is in turn activated by a selective gear transmission 108, which is driven in timed relationship with the blade shaft 50 by a cog timing belt drive 111.

Referring now to the construction of the paddles 104 and 106, it will be noted that they are substantially identical and include slice receiving vanes 112 and 114 respectively. These paddles, however, rotate in opposed directions, and particularly through a 90° arc such that the vanes 112 and 114, opposite one another in stack receiving position, pivot downwardly and away from one another to deposit the stack on the weigh-while-convey apparatus 30. A second pair of vanes 112 and 114 will simultaneously pivot downwardly toward one another and assume the stack receiving position by receiving the next slice out by the blade 46 without cessation of operation of the feeder 45. Both of the paddles may include a series of apertures 116 in each of their vanes for purposes of increasing their slice gripping and retentive ability to thereby prevent sliding of the lowermost slice of the stack as it is thrown by the blade 46. The paddles 104 and 106 also include the respective mounting posts 118 and 120 which extend into the paddle box 110.

The paddle box 110 include a housing 124 containing the Geneva transmission which takes it drive from the flexible shaft 107 which may be secured to the housing by a suitable collar 126 and drivably coupled to a suitably journalled shaft 128 mounting the worm gear 130. This worm gear 130 is meshed with the journalled worm 132 on shaft 134, which in turn fixedly mounts disc or Geneva driver 136 bearing the pin 138. In addition, the Geneva driver 136 includes a boss 140 having a circumferentially extending periphery formed with a recess below the pin 138 to provide clearance for a four-point star disc 142 having a stud 144 suitably journalled in the walls of the housing 124. The four-point star disc 142 includes a slot 146 which permits the pin 138 to ride therein. The shaft 144 has keyed thereto a gear 148 which meshes with gear 150, keyed to the journalled shaft 152, which includes a coaxial bore 154 adapted to receive the shaft 106 of the paddle 104. The paddle post 118 is retained within the bore 154 by means of the interengagement of bayonet lock pins 156 with quill-type collar 158 and is biased outwardly by means of compression spring 160. The gear 150 engages the teeth of gear 162, which in turn engages those of gear 164. Both of these gears 162 and 164 are rotatably mounted on studs 166 and 168 respectively through interposed bearings. The gear 164 meshes with gear 170 keyed to the journalled shaft 172; and as is the case with previously described paddle 104, the paddle post 120 is disposed within shaft bore 174 and retained therein by the bayonet lock pins 176 and quill-type collar 178 while being spring biased outwardly by means of spring 180.

It should be understood that all shafts in the paddle box 110 run on ball bearings in an oil bath; and all shaft or control projections are oil sealed. A large vented-type oil filler cap assembly 182 is provided for inspection and filling.

The bayonet-type of lock pins 156 and 176, with their respective associated quill-type collar 158 and 178, provide for the relatively easy removal of paddles 104 and 106. To this end, for either insertion or removal of a paddle, it need only be pressed inwardly against the bias of the particular compression spring 160 and 180 and twisted counter-clockwise to lock and clockwise to unlock as viewed in FIGS. 12 and 14.

Thus, when the flexible drive shaft 107 imparts its predetermined rotation to worm 130, the worm 132 will in turn be rotated. The Geneva driver 136, through the pin 138 interengaging surfaces of slot 146, will rotate the gear 148 a quarter turn. The paddle 104 and accordingly paddle 106, through the gear train including gears 150, 162, 164 and 170, will both rotate through a quarter or 90° turn to drop the collected stack of slices onto the weigh-while-convey apparatus 30.

The paddle box 110 is slidable set for adjustment in the quadrant bracket 103. This bracket is removably secured to the slicer guard 48 and included a pair of bracket arms 190 and 192, each of which are formed with an arcuate slot 194 within which are adapted to travel, rollers or pins 196 extending from the paddle box housing 110. Threaded nut-type clamp assemblies 198 secure the paddle box 110 relative to the bracket 103 upon the attainment of the desired orientation of the paddles 104 and 106 relative to the slicing machine 46. In this connection, a screw 200, rotatably supported by journals 202 and 204 extending from the quadrant bracket 103, is threaded in a nut 206 secured to the paddle box housing 124. Accordingly, fine adjustment of the paddles 104 and 106 is possible by merely turning the handle 208 and consequently the screw 200 to thereby arise or lower the paddle box 110 and consequently the paddles themselves.

A slidable adjustment means is conveniently provided between the quadrant bracket 103 and the blade guard 48. To this end, the bracket 103 may be slidable within an upper and lower gib 212 and 214 extending from knife guard 48. A locking means 216 serves to secure these parts to one another. Thus, a transverse adjustment is provided whereby the paddles 104 and 106 are shiftable relative to the cutting blade 46 so that the slice receiving vanes 112 and 114 respectively, of these paddles, will receive the slices directly in the center between them. Accordingly, the tendency for stacks to become distorted as they are set down by the paddles to the weigh-while-convey apparatus 30 is significantly minimized. Adjustment graduation plate 218 is provided to permit resetting accurately which will be dependent upon many different products to be sliced, the particular blade 46 employed, cross-sectional sizes of the product to be sliced, and temperatures of the ambient.

Turning now to the selective gear transmission 108, which is actuated in timed relationship with respect to the rotation of the slicer blade shaft 50 by means of the drive belt 111, it will be recalled that the flexible drive shaft 107 receives the output of this transmission. The transmission 108, of the illustrated embodiment provides three different speed ratios whereby 6, 8 and 10 slice stacks are deposited upon the vanes of the paddles 104 and 106 before they are actuated. Quite obviously, by selecting different ratios, it is possible to make different counts, thereby grouping having different numbers of slices. In taking the drive from the blade shaft 50, the timing belt 111 imparts rotation to pully 224, drivably connected to shaft 226 extending from the housing 228 of the transmission 108. This shaft 226 is suitably journalled within the housing 228 and has keyed thereto, gears 229, 230 and 232 suitably spaced from one another and from the walls of the housing by mean of spacing collars, substantially as illustrated. These gears are individually and severally adapted to drive shaft 234 suitably journalled within the housing 228. This shaft 234 drivably connected with the flexible drive shaft 107 by means of a suitable bushing 236. Under the circumstances, the flexible shaft casing is anchored to the housing 228 by means of a collar 238, substantially as shown. A gear cluster is splined to the shaft 234 to permit easy sliding into the three different speed ratios for 6, 8 and 10 slice stacks. Accordingly, this cluster will include gears 240, 242, and 244 which are respectively adapted to mesh with gears 229, 230 and 232. In this connection, a bifurcated or forked member 246 embraces the exposed side of gears 240 and 244 and at the same time is secured to rod 248 extending through the walls of the housing 228 and permitted sliding movement with respect thereto. A handle or knob 250, at one end of rod 248, facilitates the longitudinal shifting of this rod to thereby shift the gear cluster along the shaft 234 through the interposed forked member 246.

The above gear selection means is adapted to be locked in place by means of a pin 252, which includes at its lower end a stud 254 adapted to be inserted in one of a number of bores 256 located at predetermined spaced intervals in the forked member 246 to assure proper meshing engagement of the gears. The pin 252 is spring-biased by means of a compression spring 258, biased against a shoulder on the pin, as well as a shoulder on a guide 260. A handle 262 at the outer exposed end of the pin 252 enables the pin to be retracted easily so that the rod 248 may be shifted to provide the desired gear interengagement. When this is obtained, the pin 252 need only be released so that the compression spring 258 may drive the stud 254 into the aligned bore 256 and forked member 246.

In the illustrated embodiment, the interengagement of gears 242 and 230 will provide a 10-slice stack, whereas gears 244 and 232 will provide a 6-slice stack, while gears 240 and 229 will cooperate in providing an 8-slice stack before the paddles 104 and 106 will be flipped downwardly to deposit the accumulated sliced group onto the weigh-while-convey apparatus 30.

A hanger 270 may be suspended from the frame of the slicing machine 34 or the ceiling of the room in which the cold cut line of the present invention is located for purposes of supporting the flexible drive shaft 107 and assures that it does not become entangled in any moving parts to the detriment of efficient operation of the cold cut line.

Thus, a measuring means in the form of a counter, more particularly described as a selective gear transmission 108, cooperates in determining the number of slices to be deposited by the stacker 32 onto the weigh-while-convey apparatus 30. In this connection, the transmission 108 through the flexible drive shaft 107 serves to regulate the operation of the paddles 104 and 106 by actuating the Geneva four-star disc 142 through the movement of the Geneva drive 136, and consequently the gear train within the paddle box 110.

*Weigh-while-convey apparatus*

The slices of the product 44 are stacked on the vanes 112 and 114 in a slice receiving position until a preselected number of slices have been deposited thereon, at which time the paddles are actuated to transfer the stacked sliced product onto a constantly driven scale or weigh conveyor assembly 280 of the weigh-while-convey apparatus 30. The scale conveyor 282 of this assembly is constantly driven by motor 284 and at the same time is mounted so as to actuate a scale 288 upon the expiration of a certain period of time following the reception of the stacks of sliced product. The weigh conveyor 282 transfers the stacks onto the air conveyor 36 at which point those stacks within the prescribed tolerance will be permitted to pass freely, whereas those stacks not of proper weight will be pushed or shifted aside by means of a reject mechanism 38 in accordance with signals transmitted by the scale 288. The stacks of proper weight are then transferred to a further packaging station 40 along the cold cut line while the stacks of improper weight are corrected and in time similarly transferred.

As will be appreciated from the foregoing, both correct stacks of sliced product are freely passed by the reject mechanism 38 from the scale conveyor 282. However, stacks outside the prescribed limit will be registered by the scale 288 causing a pulse to be transmitted to the corrector 75 which effectively controls the size of orifice of the control valve 74. Accordingly, a pulse to the decrease side of the corrector decreases the size of the opening to correspondingly feed the product 44 at a slower rate into the slicing blade 46. On the other hand, when underweights are registered by the scale 288, a signal is transmitted to the increase side of the corrector 75 such that the speed of the feed 45 is increased thereby increasing the thickness of slice cut by the blade 46. The corrector 75 operates on an impulse principle whereby the size of the orifice opening of the control valve is changed in increments, depending upon the duration of pulse and not instantaneously from one size to another. All of this will certainly become apparent from a detailed description of the corrector 75 and flow control valve 74 in the following.

As will be observed, the weigh conveyor assembly 280 of the weigh-while-convey apparatus 30 is mounted on a scale cabinet 290 having a hinged door 292 and four adjustable legs 294. As previously mentioned, the weigh conveyor assembly 280 transfers the stacked slices to the air conveyor 36. Prior to this, however, the weight of these stacked slices on the weigh belt 282 are registered by the scale 288. Under such circumstances, the weight is transferred through the tubular support 296 which is advantageously coupled with the scale 288. This tubular support is secured to a transverse rod 298, which in turn mounts a pair of brackets 300 and 302 mounting the respective arms 304 and 306. A drive roller 308 is journalled at one end of these arms 304 and 306. A driven roll 312 is at the other end of these arms and is not only rotatable with respect thereto, but is permitted longitudinal sliding movement in slots 314. In this connection, a conveyor belt 316 is placed over the rollers 308 and 312 with the slack being taken up by spring biasing means 318 located on each arm 304 and 306, and acting on the shaft 320 of the roller 312. In order to prevent sagging, fluctuations and vibrations of the belt as a stack is deposited by the paddles 104 and 106, a plate 322 may extend between the arms 304 and 306.

The tube 296 has suitably affixed thereto, a sleeve 326 which is telescopically received by a tubular spindle 328 bracketed to the top of the scale cabinet 290. The tube 296 thus extends through the spindle 328 as well as a suitable opening 330 in the top of the cabinet to be suitably connected to the internal mechanism of the scale 288.

Reference is now made to the scale 288 which is known to the art and may be obtained commercially from the manufacturer, Wright Machinery Company, Division Sperry Rand Corporation of Durham, North Carolina, under the name Wrightronic Checkweigher. However, it should be understood that the scale 288 does not per se constitute part of the present invention; and any one of the commercially available scales may serve equally as well. The illustrated scale 288 may be of the parallelogram type having a main base 340 possessing this configuration disposed within the scale cabinet 290 and accessible through the door 292, which incidentally, may have its counterpart on the other side of the cabinet. A pair of flexible plates 342 and 344 are suitably coupled to one end of the main base with the free end of such plates freely suspending the weigh head 346 which serves to clamp the support shaft or tube 296 of the scale conveyor 280 to the scale 288 thereby rendering the scale responsive to weight placed on the weigh belt 282. The flexible plates 342 and 344 serve to additionally suspend a suitable damper 348 operable in the usual manner, as well as the core piece 350 of the differential transformer 352. The windings 354 of the differential transformer are suitably fixed to the main base 340. The core piece 350 is adjustable in its mounting bracket by means of a long thread 356 and properly spaced jam nuts 358. The reason for this adjustment being that different tare weights of scale conveyors 280 may be encountered as well as electrical centers for the differential transformer 352.

Feed control and corrector

As mentioned in the above, in connection with the description of the hydraulic circuitry of the slicing machine 34, the control valve 74 includes an orifice through which fluid passes or flows. The size of this opening determines the rate at which the pusher 45 feeds the loaf 44 into the slicing blade 46. Further, the size of this opening is controlled by the corrector 75 which is responsive to signals received from the scale 288, as to whether the stack of sliced product coming from the slicing machine and deposited by the stacker are either underweight or overweight. In practice, permissible limits are employed around the prescribed weight for the stack before a correction is made. Preferably, underweights are not tolerated, whereas overweights should not exceed as for example, a quarter ounce tolerance above the intended weight per stack.

The flow control valve 74 comprises the casing 370, having the necessary number of inlet and outlet ports for passage of the hydraulic fluid. In this connection, an inlet port 372 is tapped by line 72 leading from the rod end of the cylinder 56 so that the valve can control the feed rate of the piston 57 by regulating the flow of hydraulic fluid out of the rod end of the feed cylinder back to the reservoir 65. Line 94 will, in this case, connect the outlet port 374 of the valve to the tank 65. The flow control valve 74 is able to maintain fairly constant flow even though the difference in pressure between the inlet and outlet ports of the valve changes, by placing in a series with the basic valve 376, a second valve 378. Under such circumstances, the second valve 378 has its position at any one time determined by the pressure drop across the valve 376.

In considering the effect of an increase of pressure in the inlet port in the absence of the pressure compensator or series valve 378, an increase in flow through the valve 376 would inevitably occur. The hydrostatic compensator reacts to the increase of pressure on the upstream side of the valve 376 by partially closing the series valve 378. Increases of inlet pressure or reduction in outlet pressure cause the hydrostatic compensator to reduce the opening of this series valve 378. Conversely, decreases in inlet pressure or increases in outlet pressure cause the hydrostatic compensator to increase the opening of the series valve 378 thus holding flow constant, and consequently the advance of the feeder 45.

The second valve 378 will accordingly include a spindle 380 extending from piston 382 biased as shown, by a compression spring 384 within the chamber 386. As will be observed, hydraulic pressure on both the upstream and downstream sides of the valve 376 are applied respectively to the front and rear face of the piston 382. Accordingly, any pressure differential will be transmitted to the valve spindle 380 to cause a corresponding displacement in the value 378 to thereby assure uniform and constant flow of the hydraulic fluid from the rod end of the cylinder 56 and a fairly constant and non-fluctuating rate of advance of the feeder 45.

Referring to the basic valve 376, it will be appreciated that it includes a valve throttle 390, having a stem 392 and a bushing 394 from which extends a head 396. Any movement applied to this head 396 will be transmitted to the throttle 390 and consequently, result in a change in the valve 376, the valve orifice opening and rate of feed of the pusher 45.

Figure 18:
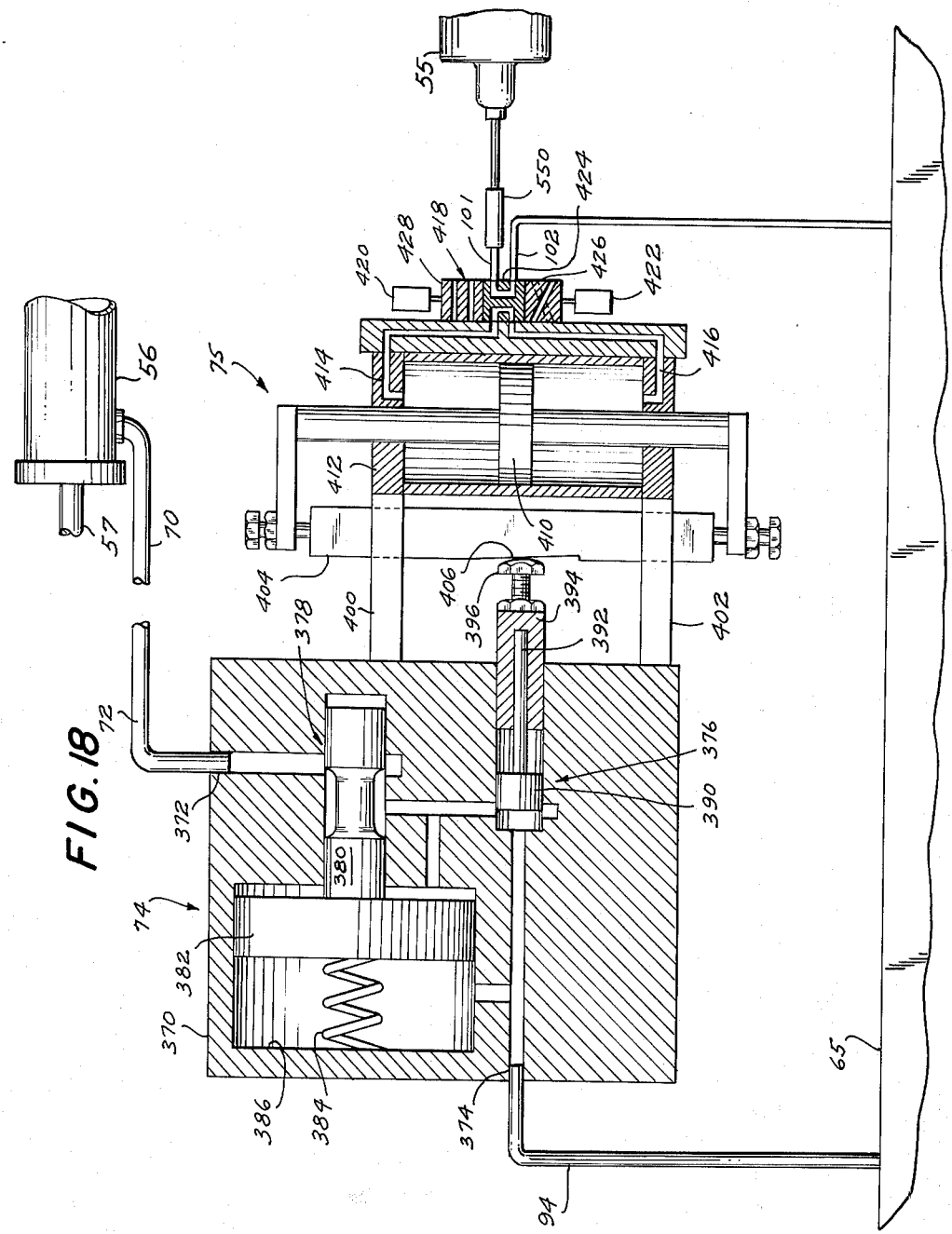
FIG. 18 is an enlarged sectional view, with parts illustrated schematically, of the flow control valve for the feed of the slicing machine and associated hydraulic circuitry.
Figure 24:
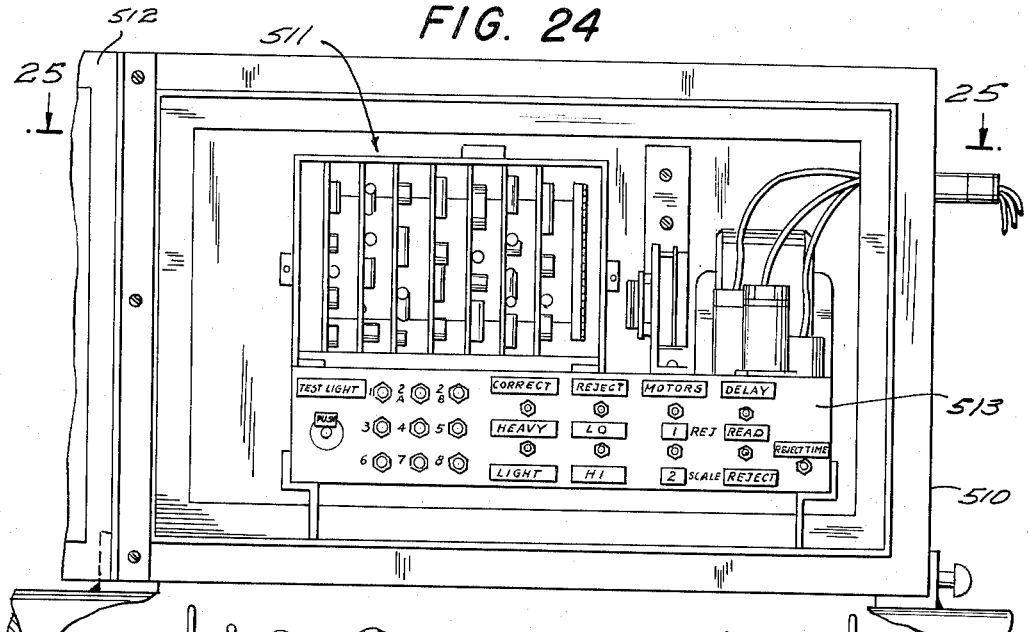
FIG. 24 is an enlarged elevational view of the rear of the box with the back door opened.
Figure 25:
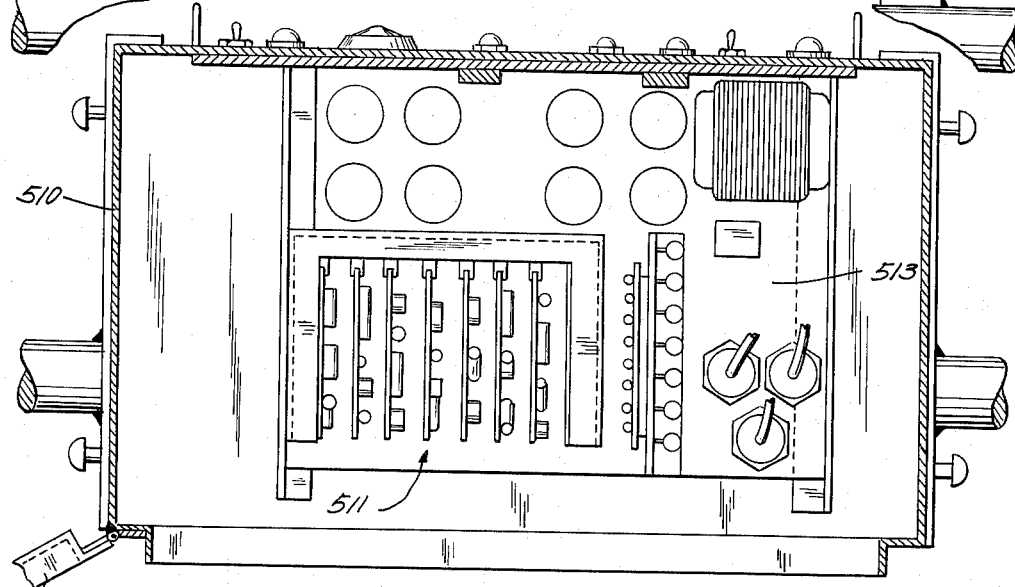
FIG. 25 is a sectional plan view taken along the line 25—25 of FIG. 24.
Figure 23:
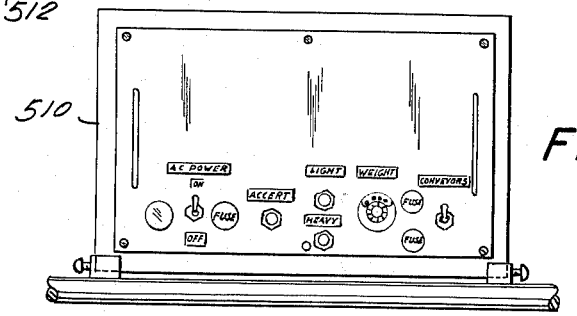
FIG. 23 is an elevational view of the box housing the electronic chassis illustrating the front panel and its various indicators and controls.

In this connection, throttle adjustments are obtained automatically upon receipt of signal from the scale 288 as to whether a particular stack of slices is not within the prescribed tolerances. This automatic means is in the form of the corrector 75 which includes a pair of brackets 400 and 402 suitably mounted to the valve casing 370. These brackets slidably mount an actuator 404 for the head 396 of the throttle 390 which actuator includes a wedge or tapered face 406 in engagement with the head 396. As will be appreciated, the tapered face 406 will serve to increase or decrease the orifice opening depending upon whether the actuator 404 is shifted upwardly or downwardly respectively within the brackets 400 and 402 as viewed in FIG. 18.

Each of the ends of the actuator 404 is secured to correspondingly located ends of piston 410, shiftable in cylinder 412 which is also mounted by the brackets 400 and 402. This cylinder 412 is formed with passways 414 and 416 which are controlled by a double solenoid actuated, four-way three position, hydraulic valve 418. The ports of this valve 418 are connected with line 101 containing hydraulic fluid at pump pressure and line 102 leading to the tank 65. Under the circumstances, the valve 418 includes an increase solenoid 420, a decrease solenoid 422; and it will have three valve positions designated schematically in FIG. 14 as neutral position 424, increase position 426, and decrease position 428. Thus, in this neutral position 424, the piston 410 will remain substantially stationary and thereby maintain the throttle 370 in its present position. When the increase solenoid 420 is energized, the increase position 426 of the valve 418 will afford communication between line 101 and 102, and the respective passageways 416 and 414 thereby shifting the piston 410 upwardly as viewed in FIG. 14 to accordingly shift the actuator 404 and cause the throttle 392 to retract to increase the size of the orifice opening. The rate of advance of the pusher 45 is accordingly increased.

On the other hand, when solenoid 422 is energized, the decrease position 428 will be presented to the lines and passageways causing the piston 410 to shift downwardly and force the orifice opening of the control valve to be decreased in an effort to reduce the rate of advance of the pusher. As will be further explained later, the solenoids 420 and 422 are energized by electrical pulses of the predetermined duration to cause the piston 410 to shift in increments and cause the orifice opening of the flow control valve 74 to be correspondingly changed. The length of pulse is selectable and it is set to be equated to a certain percentage of the weight correction to be made to the stack of sliced food product. With this in mind, the pulses sent to the solenoid valve 418 will change the orifice opening an increment to thus change rate of feed of the pusher 45. The thickness of slice will be modified accordingly and the weight of stack of slices being out and deposited on the stacker 32 will have a correction applied which is related to the amount of weight of the previous stack outside of the prescribed limits or tolerances for the stacks.

As stated, the correction in slice thickness is preferably accomplished in increments rather than having the entire correction made at once or instantaneously. The reason for this being that pockets or voids, as well as zones of less density, may be encountered in the loaf sliced and stacked; and consequently the signal to correct may be false, thereby making it more desirable to change the orifice size in increments so that it may be adjusted or returned to its original setting in a shorter period of time or thereabouts in the event that such a condition did exist.

If desired, the proportion of correction desired for underweights as compared to overweights need not be the same, and consequently the length of time of pulse applied to the increase solenoid 420 for a unit weight outside of the prescribed tolerances, can be more than that supplied to the decrease solenoid 422. In this connection, it may be found to be more desirable to permit more overweight stacks to be formed than underweights. In any event, the reject mechanism 38, to be described in detail shortly, assures that no underweights pass to the packaging stations along the cold cut line practicing the teachings of my present invention.

Air conveyor

It will be recalled that the weigh conveyor 280 transfers the stacks of sliced product deposited thereon by the stacker 32 to the air conveyor 36 which in turn conveys the stacks of proper weight to packaging stations employed and casts aside or out of line, those stacks not within the prescribed limits, so that the necessary corrections can be made. Since it is desired that the underweight stacks be pushed out of line so that they may be readily discernible by an operator whose duty it is to make correct weights, it has been found that friction between the stacks and conveying means employed at the reject station should be maintained at a minimum and certainly eliminated altogether, otherwise proper rejecting will be difficult to attain and the slices in such stacks will have a tendency of becoming disarranged.

Thus, my present invention utilizes the air cushioning effect provided by an air conveyor to enable the stacks to ride on, in effect, a layer of air, at the reject station. Accordingly, the air conveyor 36 is adapted to receive the stacks transferred by the weigh conveyor 280. This air conveyor includes a suitably supported air motor 440 and can be obtained commercially from any one of a number of sources, one of them being, for example, the Buffalo Forge Company of Buffalo, New York. This motor 440 has an upblast discharge, the output of which may be adjustable and gauged by suitable mechanism 442 ordinarily employed for such purposes. The air output from the motor is channeled through a suitable conduit 444 having a strap or drawband 446 for up and down adjustment of the air conveyor 36. The air is then passed through a screen plate 448 at a certain angle to feed these stacks forwardly and away from the weigh conveyor 280. In this connection, the air discharge through the screen plate 448 provides an air slide by placing discharge openings 450 of the plate 448 at an angle of about 60° to 70° with either face of the plate. Thus, the air emerging from these openings, in the illustrated embodiment, is substantially in the direction of travel of the stacks. By inclining the plate 448 at a slight angle with the horizontal in the direction of travel, more efficient transfer of the stacks by the air conveyor will result, and at the same time, permit the desired rejection of the underweight and overweight stacks.

The effective speed of the reject conveyor 36 should be adjusted so that the stacks are transported more rapidly than they are on the weigh conveyor 280. This is to get the stacks off the scale 288 in a minimum amount of time and before the following stacks are deposited by the stacker 32. Thus, the air conveyor 36 will transfer the stacks of proper weight to the packaging station 40 and will facilitate the displacement of the other stacks out of line by the reject mechanism 38 so that an operator at a check scale will make the necessary correction before such stacks are placed in position for wrapping or packaging.

*Reject mechanism*

The reject mechanism 38 is suitably attached to the air conveyor 36 and is operable to slide the improper stacks out of line from those coming from the weigh conveyor 280. The reject mechanism is operated essentially by a rotary solenoid 460 mounted on a bracket 462 which in turn is attached to the frame of the air conveyor 36. The output shaft of the rotary solenoid 460 has mounted thereon an arm 464 from which is suspended a plate 466 which is adapted to be placed in the line of stacks of improper weight. The normal condition of the rotary solenoid 460 is that of de-energization such that the plate 466 is in its lowered position on the screen plate 448.

When the scale 288 registers a weight of a stack travelling thereon, within the prescribed limits, it will send a signal to the solenoid 460 thereby energizing it and causing the arm 464 and consequently the plate 466 to be elevated. Thus, the stack of proper weight will be permitted free passage of the air conveyor 36 in proper line onto the packaging station 40. However, when an under or overweight stack is registered by the scale 288, the solenoid 460 will not be energized with the result that the stack will impinge upon the plate 466, be cast or forced to slide out of line on the air conveyor 36 so that the check-weigh operator can detect the stack from the remainder, possessing the prescribed weight.

*Packaging station*

As previously mentioned, the packaging station 40 may assume any one of a number of different forms employing different wrapping or packaging techniques. In the disclosed embodiment of the present invention, for illustrative purposes only, there is disclosed somewhat schematically, a commercial wrapping machine sold under the name Flex-Vac 6–12 Wrapping Machine, manufactured by the Standard Packaging Company of New York, New York. It should be understood, however, that this machine does not per se constitute my invention. Suffice it to say that the disclosed wrapping machine includes the wrapper unit 470 which functions to encase the stacks of sliced product of prescribed weight within a casing material and includes an inlet end 472 and outlet end 474 from which encased stacks are passed on to further packaging areas. As a standard part of the wrapping unit 470, a pouch or pocket conveyor 476 and packing or transfer conveyor 478 will be interposed between the discharge end of the air conveyor 36 and inlet 472 of the wrapping unit. Under these circumstances, the packing conveyor 478 will have its leading end adjacent the trailing end of the air conveyor 36 so as to receive the stacks of sliced product transferred thereby. This packing conveyor 478 is continuously driven and transports the aligned stacks of proper weight as well as the stacks outside the preset limits. The stacks of proper weight are taken off of the conveyor 478 and placed in one of a multiplicity of pockets or pouches of the pouch conveyor 476 which is also continuously driven in timed relationship with the wrapping unit 470. The other stacks, on the other hand, are corrected by a check weigher in the packaging station area 40 and then placed in one of the pouches of the conveyor 476.

Both the packing conveyor 478 and pouch conveyor 476 are supported by an adjustable table 480, a pair of side bracket plates 482 and 484 which serve to mount, for rotation, the rolls of the packing conveyor 478 on which the endless conveyor belt 486 is placed. The trailing end of this conveyor is extended to a distance short of the wrapping unit 470. A stop plate 488 is supported by the bracket plates 482 and 484 at the trailing end of the packing conveyor 478 to prevent any of the stacks of sliced product from falling onto the pouch conveyor prematurely. The drive for the packing conveyor is taken from a variable speed motor 490 suspended beneath the table 480.

The pouch conveyor, on the other hand, takes its drive from that of the wrapping unit 470 so that accurate synchronization is attained with its leading end falling short of that of the packing conveyor 478, whereas its trailing end extends beyond that of the packing conveyor into the inlet of the wrapping unit 470. Here the stacks are discharged and received by the wrapping unit 470 so that the selected casing material can be placed thereon.

The pouch conveyor 476, as the name implies, includes two series of aligned pockets or pouches 492 with each series separated by a plate 494. Each pocket is not only defined by the centrally located plate 494 and one of the side plates 496 as the case may be, but a pair of pivotal plates as well, including a leading plate 500 and trailing plate 502. These plates in the disclosed commercial wrapping apparatus, pivot downwardly at the trailing end of the pouch conveyor 476 to permit the discharge or release of the contained stack into a pouch of the wrapping unit 410 at which point the wrapping is initiated. The pouch conveyor 476 is in effect an endless conveyor with empty pockets 492 presenting themselves continuously for reception of stacks of sliced product to be led into the wrapping unit 470.

Thus, a check-weigh station may be located at the leading end of the packing conveyor 478 at which may be located a table 514 on which a scale 515 of the over-under type, for example, may be located as well as slices or parts of a slice of the particular product being sliced. An operator or check weigher at this station may make correct weights by removing the incorrect stacks from the packing conveyor 478 and placing them on scale 515. These corrected stacks are then placed in one of the empty pouches of the pouch conveyor 476.

Prior to the entry of the stacks contained in the pouches 492 into the inlet 472 of the wrapping unit 470, an operator can place printed film inserts bearing product identification on top of each stack. This permits using roll stock with brand identification only so that there is no time lost on the cold cut line of the present invention in changing over to a different product.

The wrapped or encased stacks of slices emerge from the outlet end 474 and may be discharged upon another conveyor 504 which will transfer the wrapped stacks, if desired, to a further packaging area at which boxes may be located and made for receiving a predetermined number of the wrapped stacks.

*Electronic control*

The electronic control or rather a majority of its components of this invention is preferably housed in a single cabinet or box 510 secured to the frame of the slicing machine 34 having a rear hinged door 512 through which access is provided into the interior of the cabinet and the electronics mounted on the chassis 513. The electronics of the present invention are designed so that the less delicate components such as the condensers and those constituting the power supply are somewhat permanently mounted, whereas the more delicate components are subdivided into printed card circuitry 511 permitting a particular card to be removed and replaced by another without complicated circuit analysis when a malfunction occurs.

Figure 26:
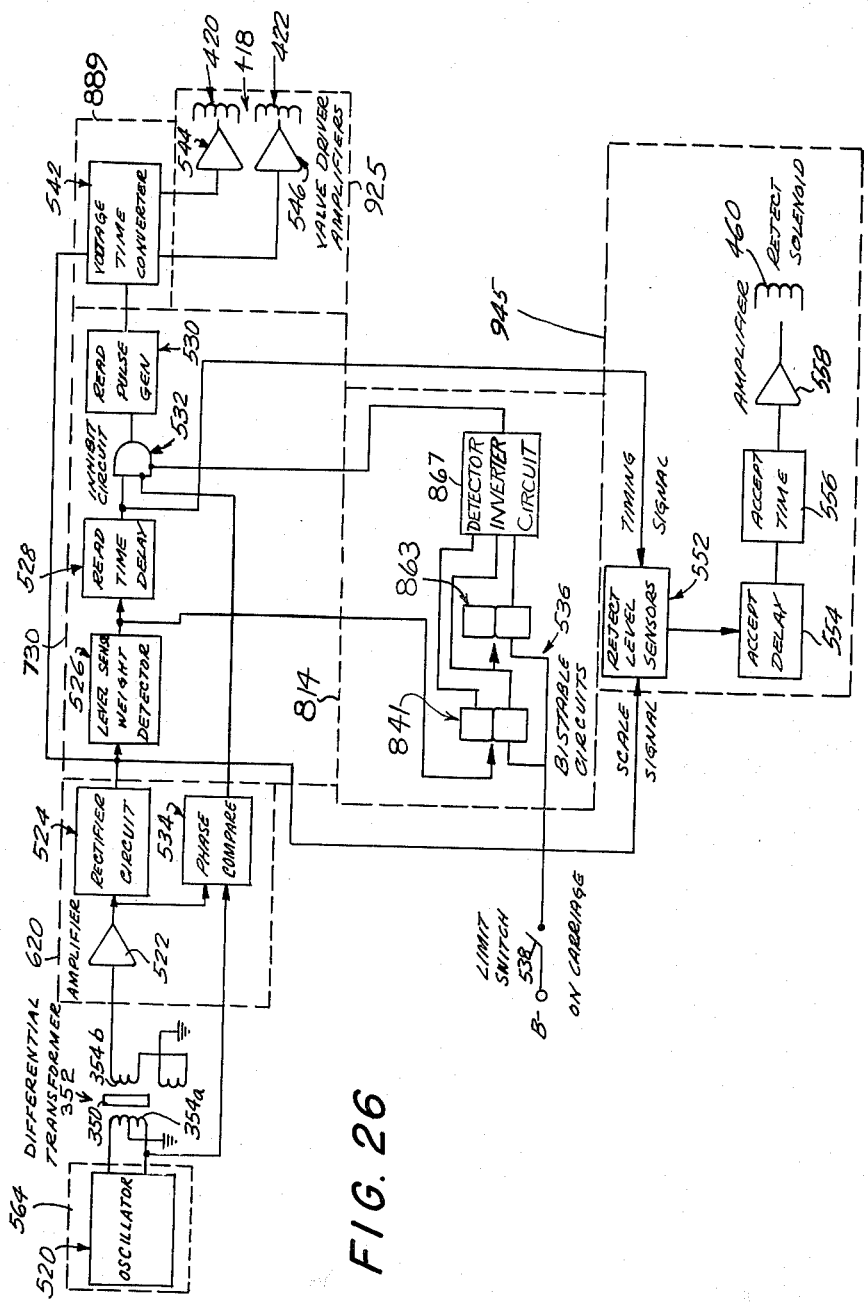
FIG. 26 is a block diagram of the electronic controls of the present invention.
Figure 29:
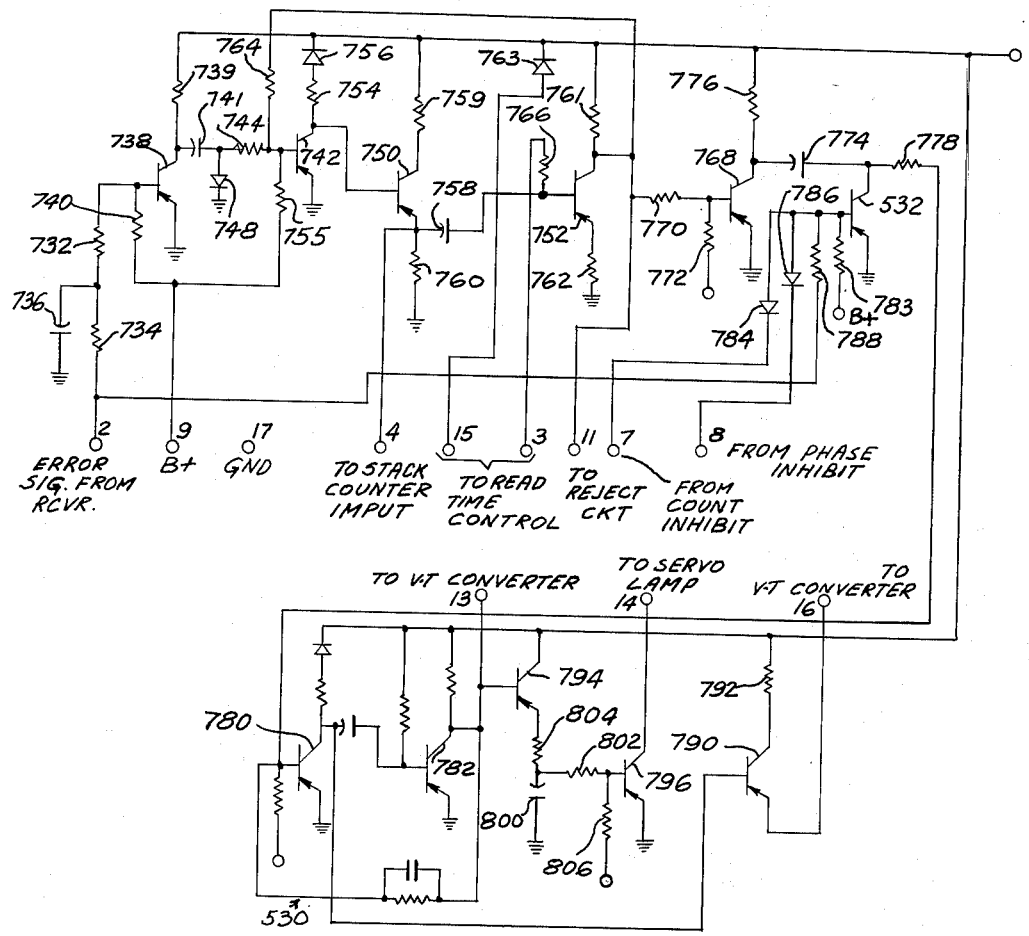
FIG. 29 is the printed circuit for the weight detector card.
Figure 30:
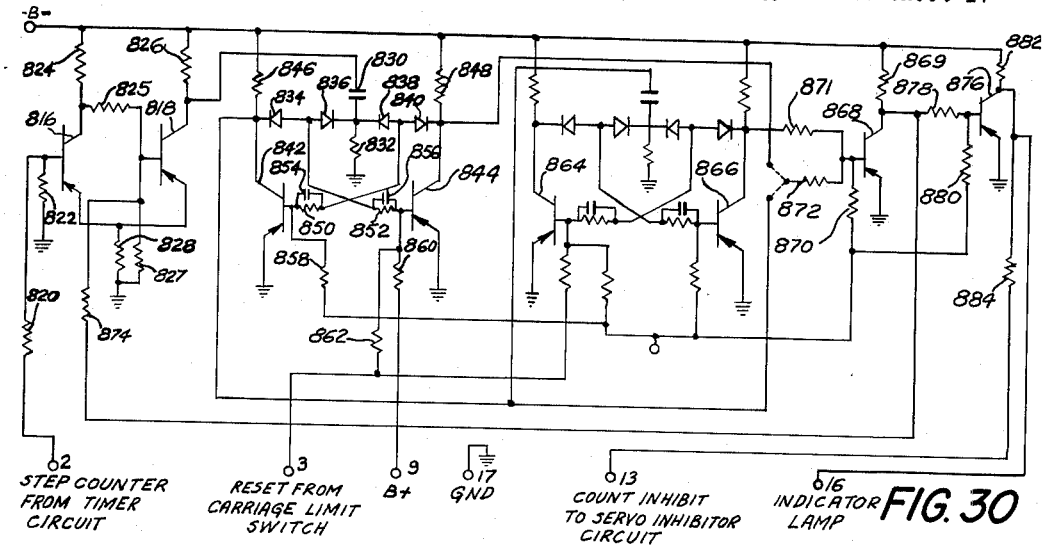
FIG. 30 is the printed circuit for the first stack counter card.
Figure 31:
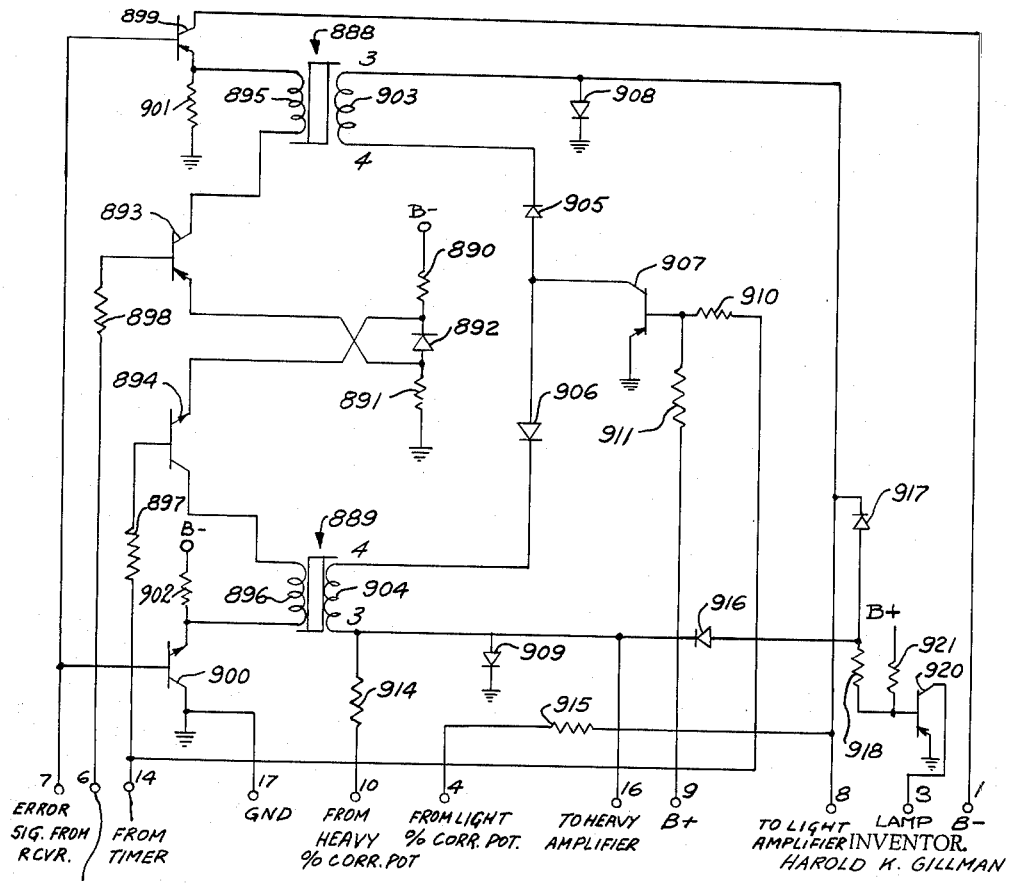
FIG. 31 is the printed circuit for the voltage time converter card.
Figure 34:
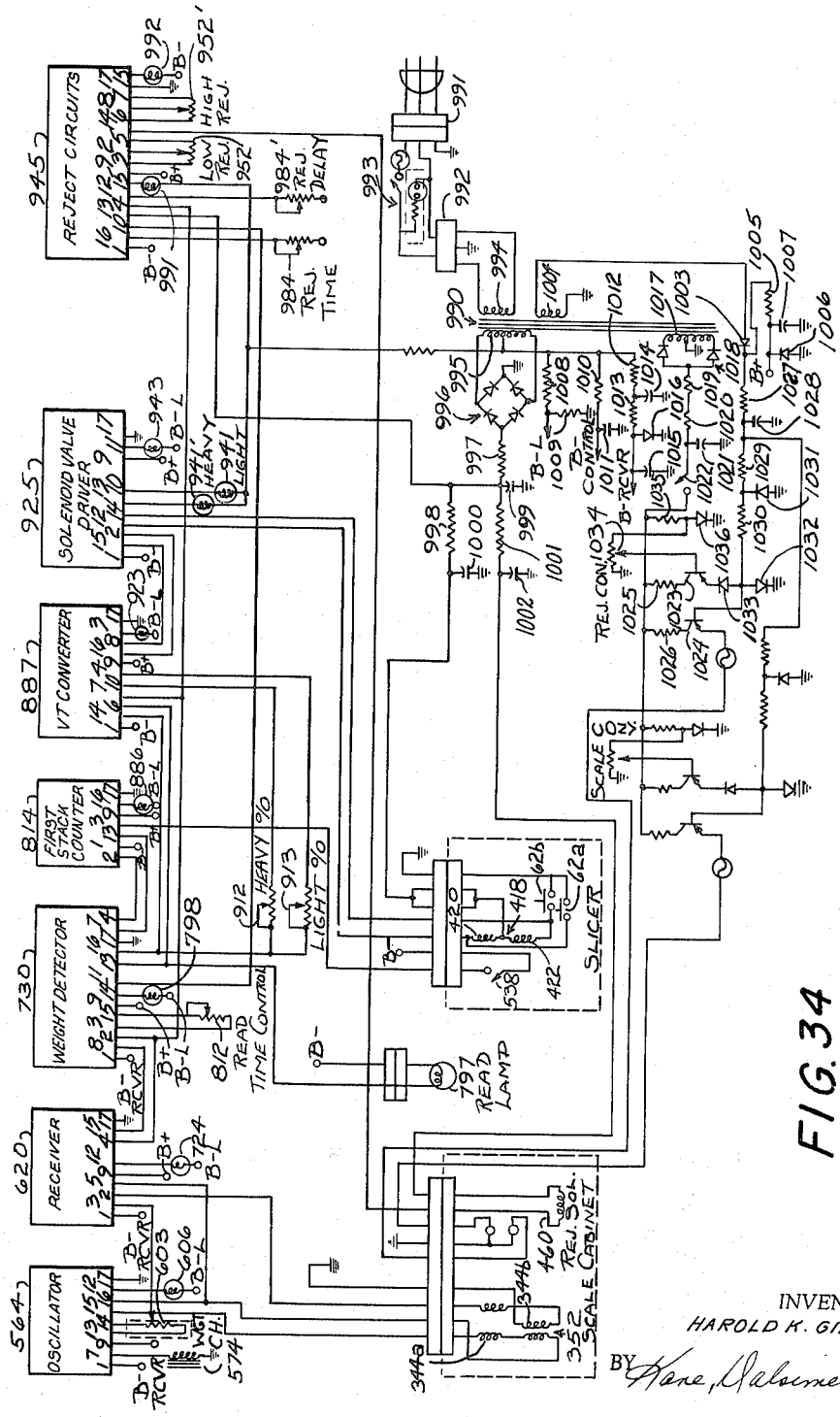
FIG. 34 is a wiring diagram of the electronic circuitry within the chassis and components extending thereto from the elements with which they are associated, and particularly illustrating power supplies usable with the present invention.

FIG. 26 is a block diagram of this Electronic Cold Cut Control which is in effect a servo system used to control the weights of stacks of cold cuts as they are sliced and stacked. The stack of sliced cold cuts is deposited on the scale conveyor 280, and, while the stack is on the scale 288, it is weighed, and an error signal derived assuming that the registered weight is not of the prescribed magnitude. The error signal causes the application of a correction in the feed rate of the loaf into the slicer blade 46, in such a direction and of such magnitude as to bring the weight of the succeeding stacks to the proper value.

The weight is measured by sensing the scale position with the linear differential transformer 352.

A signal from the oscillator circuit 520, at the selected frequency, is applied to the primary winding 354a of the transformer 352. The output of the secondary 354b of the transformer is a function of the position of the core 350. It should be noted that the output voltage decreases linearly from a maximum as the core 350 approaches a central position in the transformer 352. At some point, a "null" is reached and as the core 350 is advanced further, the output again increases linearly. The signal output before null is of opposite phase from the signal output past null.

The signal from the transformer 352 is applied to an amplifier 522. The amplifier increases the signal level and serves to limit the maximum signal amplitude in the instant embodiment. The A.C. output of the amplifier 522 is rectified by the rectifier circuit 524. Due to the rectifier voltage drop, residual null voltage is suppressed. The gain of the amplifier 522 is such that the output voltage changes 3 volts with a one ounce change in weight in accordance with the parameters employed for the disclosed embodiment. In operation, the transformer core 350 is adjusted to produce a D.C. output from the rectifier of 4 volts with the desired weight on the scale 288. For a weight one ounce heavy, the output is 1 volt, and for a weight one ounce light, the output is 7 volts. Since the stack of slices does not remain on the scale 288 indefinitely, and since there are forces on the scale due to the impact of the stack landing on it, the scale should not read or register continuously. Therefore, the output of the rectifier circuit 524 must be sampled at the proper time. The most desirable time reference is the impact of the meat on the scale 288. To detect this impact, a circuit 526 senses the level of the output of the rectifier circuit 524. With no weight on the scale, this remains at 9 volts. The level sensor 526 detects when the level drops below 7 volts and triggers the read time delay 528. The read time delay 528 is adjusted to trigger the read circuit 530 at the best time for reading the scale 288, for example, after the scale has settled down from the impact, and before the stack has started leaving the scale.

Between the read time delay and the read pulse generator is an inhibit circuit 532 which prevents reading of the scale 288 for any of the following reasons:

(1) The stack on the scale is one of the first two stacks of the loaf (determined by the stack counter 536 to be described later).

(2) The stack is very light (false trigger, bumping of scale, etc.). This is determined by a level sensing amplifier.

(3) The stack is very heavy. (The scale is down so far that the transformer 352 is past null. This is determined by a phase comparison circuit 534 that tests the phase of the output signal against the oscillator output.)

The stack counter 536, mentioned above, is a two stage binary counter which is reset by a limit switch 538 as the slicer carriage for the feeder 45 reaches the end of its travel. This also prevents reading of the scale 288 on the last two stacks of each loaf. When the carriage returns, the counter reset signal is removed, and the output of the level sensing circuit 526 can trigger the counter. When the counter reaches a count of two or three, or the integer amount to which it can be adjusted, the output of the inhibitor 532 is turned off, and the trigger input is disabled to prevent further counting until the counter is reset again.

If none of the inhibit signals are present at the end of the read time delay, the read pulse generator 530 is triggered. The read pulse enables gating circuits of a voltage-time converter 542 to apply the scale amplifier rectifier output voltage to one end of the primary winding of each of two transformers in the converter circuitry. The other end of each of the primary windings is returned to a reference voltage. The material of the transformer is a square hysteresis loop material. The core, before the time of the read pulse, is magnetically saturated in one direction. If the scale rectifier output is not the same as the reference, one transformer is further driven towards saturation, while a portion of the magnetic flux "stored" in the other is reversed. The amount of flux reversed or "switched" in such a core is proportional to the product of the voltage applied to the winding, and the time interval for which it is applied.

The read pulse generator 530 produces a constant pulse width each time the scale 288 is read, and the transformer constants of the converter 542, in a commercial application of the invention, are such that a scale output 3 volts different from the reference, applied for 20 milliseconds (the period of the read pulse) will just reverse all of the magnetic flux in the core. The amount of flux switched, is therefore proportional to the error up to 1 ounce, and which of the cores is switched is dependent on the direction of the error.

Immediately after the read pulse, a voltage is applied to the secondary of both converter transformers. If one core has been switched, it will be switched back to its original saturated state. The time required to bring this about is directly proportional to the amount of flux that was reversed by the error signal, if the switching voltage is constant. When the core again reaches saturation, the impedance of the secondary winding drops greatly and short circuits the switching voltage. The switching voltage applied to the secondary of each converter transformer is sensed by one of the amplifiers 544 and 546 depending upon the direction of error. A pulse is applied then to either the increase solenoid 420 or decrease solenoid 422, as the case may be, of the double solenoid hydraulic valve 418 for the duration of the switching time of the core of the particular converter transformer. The constants of the core and secondary winding of the converter transformer of the embodiment under consideration are such that the time to switch the core for a 1 ounce error is about 250 milliseconds with the lowest switching voltage applied. The switching voltages are adjustable over a three to one range for each transformer, to provide a means of adjusting the percent correction.

As described in detail, the valve 418 has a center-off position 424, and two on positions 426 and 428. The two on positions are selected by energizing the solenoid corresponding to the desired position. If no solenoid is energized, the valve remains in the off position. The valve serves to connect the ends of a double acting hydraulic cylinder 412 to the hydraulic supply when the solenoids are energized. The connections of the valve 418 and cylinder are such that when one solenoid is energized, the piston 410 is moved in one direction, and when the other solenoid is energized, the piston 410 moves in the reverse direction.

The rate of speed of the piston 410 when the valve 418 is energized is controlled by a needle valve 550 (FIG. 18), and for a given needle valve setting, is a constant. Thus the amount of motion of the piston 410 is proportional to the time the valve 418 is energized, which in turn is proportional to the error signal. The piston 410, as stated, is mechanically coupled to a cam or wedge type of actuator 404 that actuates a hydraulic flow control valve 74. Motion of the cam, produced by the piston, acts to change the setting of the flow control in such a direction that the error is reduced. It has been found that due to product irregularities, the best control action does not result when the system is adjusted to make full correction, but when the correction is reduced to 30 to 50 percent.

When the read time delay is ended, regardless of whether the read pulse is inhibited, the scale output is sampled by the reject level circuits 552. These circuits sense the scale amplifier-rectifier output level, and hence the weight of the stack on the scale 288. There are two level sensing circuits adjusted by potentiometers, used to set the high and low reject limits. If the scale output falls between the levels at which these two circuits are set to respond, the accept delay circuit 554 is triggered. At the end of the accept delay, the accept time circuit 556 is energized, and the amplifier 558 energizes the accept or previously termed reject solenoid 460 to permit the stack to pass the rejector mechanism 38. The delay is required because the reject mechanism is some distance away from the weigh reading point on the conveyor 280. If the weight does not fall within the limits of the two level sensing circuits 552, but is either too high or too low, the solenoid 460 is not actuated and the stack in question is displaced from the accepted stacks while on the air conveyor 36.

The electronic control is most advantageously segregated in printed circuit cards conveniently mounted in the cabinet 510 and easily removed therefrom for replacement when a malfunction is detected. These circuit cards and their respective mounted components will now be described.

Oscillator card

This card 564 provides the selected frequency as a sinusoidal signal to the differential transformer 352. Capacitors 566, 568, 570 and 572, with the inductor 574 (not on card), comprise a tuned circuit. Series capacitors are used to provide "taps" on the tuned circuit without necessitating a tapped inductor. Transistor 576 provides the necessary gain to produce oscillation, operating in the emitter follower amplifier mode. Resistor 578 provides feedback to the tuned circuit; and the signal output is obtained from the junction of capacitors 566 and 568. Transistor 580 is a buffer amplifier stage, with resistor 582 providing D.C. bias. Resistors 583 and 584 serve as resistors for the respective transistors 576 and 580. Capacitor 586 is an interstage coupling capacitor, while resistors 588 and 590 provide D.C. bias for the output stage transistor 592. Transistor 592 is a power emitter follower. Resistor 594 is the load resistor for this transistor and capacitor 596 is the coupling capacitor. Transformer 598 provides a balanced-to-ground signal output to drive the differential transformer 352. Resistors 600 and 602 provide signal limiting for the signal applied to the weight change potentiometer 603 (not on card) to be described below.

Transistor 604 and its associated components comprise a circuit to drive an indicator lamp 606 (not on card) which indicates that the oscillator 520 is operative. Capacitor 608 is the coupling capacitor to this circuit. Diode 610 is a "clamp" that causes capacitor 608 to charge on the positive half cycle of the signal. Resistor 612 limits the base current of transistor 604 and resistor 614 provides bias therefor.

Receiver phase detector card

This card 620 provides the amplifier 522 and rectifier 524 for the output of the scale differential transformer 352. It also contains the Phase sensing or comparison circuits 534.

Transistors 622 and 624 and associated components comprise a two stage, common emitter amplifier 522. Resistors 626 and 628 provide bias for transistor 622, and the base return being to ground through the differential transformer secondary 354b. Capacitor 630 is the emitter bypass capacitor. Unbypassed resistor 626 provides degeneration to stabilize the gain of transistor 622 while resistor 632 is the collector load therefor. Capacitor 634 and resistor 636 provide decoupling and additional filtering of the negative supply voltage for the first stage. Capacitor 638 is the interstage coupling capacitor.

Resistor 640 is the base return for transistor 624. Resistors 642 and 644, as well as capacitor 646, serve the functions for transistor 624 that are served by the corresponding components of transistor 622. Capacitors 630, 638 and 646 are chosen to reduce the low frequency gain of the amplifier 522 in order to reduce any hum introduced by the transformer leads or power supply. Resistor 650 is the collector load for the second stage, whereas capacitor 652 serves the purpose of reducing the high frequency response of the amplifier, to reduce the circuit's susceptibility to interference.

Transistors 654 and 656 comprise a complementary emitter follower circuit. Resistor 658 is a current limiting resistor for this stage. A complementary emitter follower has the property of having low output impedance for both negative going and positive going signals, and is required to drive the voltage doubler rectifier 524a.

The rectifier circuit 524a comprises capacitor 660, diodes 662 and 664, and capacitor 666. The values of capacitors 660 and 666 are chosen to provide the minimum ripple consistent with allowing response time faster than that of the scale 288. To provide a high load impedance for the rectifier 524, and allow a very low output impedance to the circuits driven by this signal, cascaded emitter followers 668 and 670 are employed. Resistor 672 provides bias stabilization for transistor 668 and resistor 674 provides bias stabilization for transistor 670, whereas resistor 676 is a load therefor.

Transistors 678 and 680 comprise a Schmitt Trigger circuit. Resistors 682 and 684 provide the necessary bias, and reduce the signal level to the proper value to drive the trigger circuit. Transistor 678 is the first stage with resistor 686 serving as the collector load. Resistor 688 is the common emitter resistor which provides feedback in the trigger circuit, while resistors 690 and 692 function as the coupling resistors. Transistor 680 is the second stage, and resistor 694 is its collector load. The output of the trigger circuit is a square wave, of peak to peak amplitude slightly smaller than the negative supply voltage. The phase of the square wave is opposite the output of the amplifier 522, and is applied through resistor 696 to the base transistor 698, which serves as the phase comparator.

Transistor 700 is a common emitter amplifier used to produce a square wave phase reference from a signal taken from the oscillator 520. Resistors 702 and 704 are respectively coupling and bias resistors for the amplifier input and resistor 706 is the collector load. The output of transistor 700 is also fed to the base of transistor 698 through resistor 708. Resistor 709 serves as the collector load and resistor 710 provides bias.

When the output of the phase reference is the same in phase as the output of the amplifier trigger circuit, both signals are off at the same time for part or each signal cycle, and transistor 698 is allowed to turn off. This produces a D.C. output from the double rectifier circuit 524b which includes capacitors 711 and 712, and diodes 714 and 716 through resistor 717. This is the phase inhibit signal placed upon the inhibitor 532 that prevents the Read pulse. When the two inputs to transistor 698 are out of phase, at least one is always on, and there is no input to the rectifier circuit 524b.

Resistors 718 and 720 and transistor 722 comprise an amplifier that drives a second indicator light 724 (not on card) which indicates that the phase detector circuit 534 is operative when the scale 288 is pushed below its normal desired weight point.

*Weight detector, timing and servo inhibit card*

This card 730 contains the circuits for some of the miscellaneous functions performed by the control.

Resistors 732 and 734 and capacitor 736 integrate the signal from the output of the scale amplifier-rectifier. The output of the integrator is applied to the base of transistor 730 having resistor 739 as its collector load and functioning as the level sensed detector 526. Resistor 740 is a biased resistor for this transistor, and is adjusted so that as long as the input to the integrator is above 7 volts, it will remain in the conducting state. This condition is fulfilled with no weight on the scale 288. When a stack lands on the scale, the voltage falls below 7 as the scale passes below the point at which it would come to rest with a stack weighing 1 ounce less than the desired weight. When transistor 738 turns off, its collector rises to the negative supply voltage, capacitor 741 charges through the base of transistor 742 in series with resistor 744. When transistor 738 again turns on, capacitor 741 discharges through diode 748.

Transistors 742, 750 and 752, with their associated components comprise a monostable multivibrator or timer circuit. This circuit is the read delay timer 528. It is started by the charging of capacitor 741 through the base of transistor 742, thereby turning this transistor on. Resistor 754 is the collector load and resistor 755 is the bias therefor. Diode 756 helps isolate the circuit from noise or interference that could be introduced by the power supply. When transistor 742 is turned on, its collector voltage drops from negative supply voltage to zero. Transistor 750 is an emitter follower which serves to lower the charging impedance for capacitor 758 at the end of the timing cycle. Resistor 759 is a current limiting resistor, whereas resistor 760 is the emitter load resistor. Similarly, resistor 761 is a current limiting resistance and resistor 762 is the emitter load resistor for transistor 752. The diode 763 is provided and serves as a filter. The emitter of transistor 750 follows the collector of transistor 742, and capacitor 758 couples the positive voltage swing to the base of transistor 752, reverse biasing this base and turning transistor 752. The collector of this transistor 752 then swings from ground to the negative supply voltage. The negative supply voltage is coupled to the base of transistor 742 through feedback resistor 764, and the circuit remains in its unstable state regardless of the input from transistor 738. Capacitor 758 discharges through resistor 766 and the read time control 812 until transistor 752 turns on, at which time the feedback is removed, and the transistor 742 turns off. Capacitor 758 charges through transistor 750 which lowers the charging impedance and increases the speed of recovery of the circuit. The discharge rate of capacitor 758, and hence the time, is determined by the value at which the read time control 812 is set.

The voltage at the emitter of transistor 742 changes from ground to negative supply at the proper time to trigger the read pulse generator 530, but due to the charging of capacitor 758, the rise time is too slow. For this reason, the output of transistor 752 is inverted by transistor 768. Resistor 770 is the coupling resistor, and resistor 772 is the bias resistor. At the start of the read delay, transistor 768 turns on, and capacitor 774 is discharged. When the delay is ended, transistor 768 is turned off, and capacitor 774 charges through the collector load, 776, and resistor 778, as well as the base of transistor 780. Transistors 780 and 782 and associated components including diode filters, feedback resistor, biasing resistors and collector loads, comprise a monostable circuit which functions exactly like the one described above and for this reason will not be described in detail. Transistor 532 is the read inhibit circuit, previously mentioned, and resistor 783 is its biasing resistance. The presence of inhibit signals on the inputs to diode 784 or 786, or the error signal being greater than 7 volts at the input to resistor 788, causes transistor 532 to turn on. If this transistor 532 is on at the end of the read delay time, capacitor 774 charges through it, and cannot trigger the read pulse generator 530. Both normally on and normally off read signals are required to gate the voltage-time converter circuits 542. The normally off (ground) signal is supplied from the collector of transistor 782. The normally on (negative supply) signal is supplied through emitter follower 790 and current limiting resistor 792.

Transistors 794 and 796 and associated components comprise a circuit to respectively drive the indicator lamps 797 and 798 (not on card) for this card. Transistor 794 conducts for the duration of the read pulse; and capacitor 800 is charged during this time. This capacitor discharges through resistor 802, turning transistor 796 on for about ½ second. Resistor 804 serves as a current limiting resistor, while resistor 806 provides bias.

*First stack counter*

This card 814 contains the counter and amplifiers required to perform the function of counting stacks and providing an inhibit signal for the Read circuit 530.

The input to the counter circuit is obtained from the read time delay circuit 528 through inhibitor 532. This signal goes on when a stack is detected on the scale 288. Transistors 816 and 818, and the associated components comprise a Schmitt trigger circuit. The rise time of the pulse at the input is inadequate to trigger the first Bistable in the counter circuit, and the trigger serves the purpose of shaping the input pulse. Resistors 820 and 822 set the trigger threshold. Resistor 824 is the load resistor for transistor 816, while resistor 826 is the collector load for transistor 818. Resistor 825 serves as the coupling resistor and resistor 827 provides bias for transistor 818 with resistor 828 being the common emitter feedback resistor.

The signal from the collecter of transistor 818 is differentiated by capacitor 830 and resistor 832 and applied to the diode circuit including diodes 834, 836, 838 and 840. These diodes perform the function of "steering" the input pulse in such a direction as to turn on the side of the bistable that was previously off. Thus for every input pulse, the bistable reverses state.

The first bistable circuit 841 comprises transistors 842 and 844 and associated components. Resistors 846 and 848 are the collector loads. Resistors 850 and 852 with capacitors 854 and 856 serve as the cross coupling networks. Resistors 858 and 860 are the bias resistors, while resistor 862 is a D.C. reset resistor.

The second bistable circuit 863 is comprised of transistors 864 and 866 and associated components. Its operation is identical to that of the first bistable. The trigger input for the second bistable is received from the output of the first bistable.

When the carriage of the feed 45 on the slicer machine 34 nears the end of a loaf 44, the limit switch 538 is closed. This switch applies a voltage to the reset input of the card 814, causing transistors 844 and 864 to conduct. Pulses from the input may cause triggering of the first bistable, but as long as the switch is closed, the bistable is forced to return immediately to the reset condition. After the carriage return, the reset lead is no longer energized, and the circuits 841 and 863 are free to count.

There are four possible combinations of the states of two bistable circuits. Two circuits arranged in cascade in this manner would go through the four states in sequence and then repeat if trigger pulses were applied continuously. Reference is not made to detector inverter circuit 867. Transistor 868, with its collector load 869 and bias resistor 870, is a detector that can detect any one of the four states, depending upon its connections to the two circuits. In this connection, transistor 868 is turned on when negative voltage is applied to either resistor 871 or 872. In one of the four states of the bistables, the outputs connected to these resistors are both at ground potential. When this condition occurs, the collector of transistor 868 rises to a negative voltage. This applies a voltage through resistor 874 to the base of transistor 822, disabling the Schmitt trigger circuit, and causing the bistables to remain in this state until they are reset.

Transistor 876, is an inverter stage. Resistor 878 is the coupling resistor; whereas resistors 880 and 882 are respectively the transistor bias and collector load. When the circuits are reset, and until the correct count is reached, transistor 868 is conducting and there is no input to transistor 876. This transistor 876 is accordingly turned off, and the negative voltage at its collector is applied to the read pulse inhibitor 532 described previously through resistor 884. Transistor 876 also drives an indicator lamp 886 that is lit when the counter is not inhibiting the read signal.

*Voltage time converter card*

This card 837 contains the two square hysteresis loop core transformers 888 and 889 and associated circuits for providing the time signals to the solenoid valve 418.

The network consisting of resistors 890 and 891 and diode 892 provide the reference voltage against which the scale amplifier-rectifier output is compared. Transistors 893 and 894 are the D.C. gates which connect one end of the transformer primaries 895 and 896, to the reference during the read pulse. These gates are turned on by the grounding of the end of resistor 897 and the connection of the end of resistor 898 to the negative voltage by the two outputs of the read pulse generator 530. In the absence of the read pulse, resistor 897 is returned to a negative voltage and resistor 898 to ground. This turns off both transistors 893 and 894.

Transistors 899 and 900 are emitter followers required to drive the transformers. They are connected to the output of the scale amplifier-rectifier and are coupled with emitter load resistors 901 and 902 respectively.

Both transformers are not returned to the same reference voltage, but are separated by the drop across diode 892. This drop compensates for some of the nonlinearities in the system such as the drops across transistors 893, 894, 899 and 900, and the operating time of the solenoid valve 418.

The transformer secondaries 903 and 904 each contain many more turns than their respective primaries, and when the read pulse occurs, depending on the magnitude of the error, a large voltage can appear across the secondary. Since the voltage should appear across one and not the other, the secondaries are isolated by diodes 905 and 906. Transistor 907 is a high voltage transistor, that is turned off during the read pulse, allowing either secondary winding to produce a high voltage on terminal 4 of winding 903 or 904. Terminal 3, on the other hand, is prevented from going positive at this time by diodes 908 and 909. Resistor 910, extending from the base of transistor 907 is connected to the normally on side of the read pulse generator 530, holding this transistor in the conducting state except during read pulses. A bias resistor 911 is also coupled with the transistor.

After the read pulse, transistor 907 turns on and connects terminals 4 of the secondaries of the transformers 888 and 889 to ground. A voltage is applied to the other end of each through the percent correction potentiometers 912 and 913 (not on card) and resistors 914 and 915. If the scale output indicated "heavier" than the reference, the core of transformer 889 was switched to an extent depending on the magnitude of the error. If the error was "light" transformer 889 was switched. When the voltage is applied either to the secondary 903 or 904, the current through the secondary of the transformer that was switched is limited due to the switching action. When the core of the particular switched transformer reaches saturation, the current is limited only by the D.C. resistance of the winding, and the switching voltage is shorted. The voltage therefore is sustained for the time necessary to re-saturate the core. This time is directly proportional to the error. The timed pulse is applied to one of the amplifiers 544 and 546 that drive the solenoid valve 418.

Diodes 916 and 917 serve to couple the signal through resistor 918 to the base of transistor 920. Resistor 921 is a bias resistor for this transistor. Transistor 920 drives the indicator lamp 923 (not on card) that flashes whenever a correction is made.

*Solenoid valve drive card*

This card 925 contains the two amplifiers 544 and 546 that drive the solenoid valve 418. The two amplifier circuits are identical and for this reason only one will be described.

The signal from the output of the voltage-time converter 542 is applied to the base of transistor 926 through diodes 927, 928 and 929, and resistor 930. The diodes provide a voltage drop to give the necessary threshold for the input of the amplifier. The "off" voltage from the voltage-time converter 542 makes a threshold necessary. Resistor 931 is a bias resistor for transistor 926 and the collector load is provided by resistor 932. A diode 933 couples the output of transistor 926 to the input of transistor 934. The use of a diode maximizes the power transfer between stages, allowing large power gain in a three stage amplifier. Under the circumstances, transistor 934 provides the second amplifier stage. Resistor 935 is the bias resistor for this transistor, and resistor 936 is its collector load. Diodes 937 serves to couple the output of the second stage to the power transistor 938 which has coupled with it, bias resistor 939. The solenoid coil 420 is the load for transistor 938.

Diode 940 couples the output to the "light" indicator lamp 941 on the front panel. Diodes 942 and 942' serve to couple the output of both the "heavy" and "light" correction amplifiers 544 and 546 to the card indicator lamp 943 on the back of the chassis 514.

Reject circuitry card

This card 945 contains circuits adapted to detect the output level of the scale amplifier-rectifier, and determine whether this output is within proper limits through the operation of the reject level sensors 552 to be described below. If the output is within the predetermined limits, a signal is generated which actuates the "accept" solenoid 460 and the stack of slices whose weight registered has been thus permitted free passage. If, however, the output is outside of the prescribed limits, this solenoid is not energized and the particular stack is displaced.

Transistor 946 is a level sensing amplifier with resistor 947 functioning as the collector load. A D.C. reference voltage is applied to its emitter from the regulated supply (regulated by resistor 948 and zener diode 949) through a voltage divider consisting of resistors 950 and 950', and a potentiometer 952 (not on card). The potentiometer provides for adjustment of the bias at the emitter. When the error signal is above the reference voltage (more negative), base current is supplied through resistor 953, and transistor 946, dropping the collector voltage from the negative supply voltage to the emitter reference voltage.

Transistor 954 and its associated components comprise an inverter amplifier. Resistor 951 is the coupling resistor, resistor 955 is the bias resistor, and resistor 956 is the collector load for this transistor 954. This stage is biased so that when transistor 946 conducts, transistor 954 is turned off.

Transistors 946' and 654' and associated components comprise a level detector and inverter identical to the circuit just described except that the levels to be sensed are lower. For this reason, their respective circuitry will not be described in detail. In operation, the respective bias voltages are adjusted so that when the weight is in the acceptable range, the scale amplifier-rectifier output is between the two reference voltages, and consequently the output of one of the inverters is on, and the other off.

The circuit comprised of transistors 957, 958 and 959 and associated components is an exclusive "or" circuit 960 with transistor 959 having coupled therewith bias resistor 965 and collector load 966. This circuit is connected to the two inverter circuits. If both inverter outputs are at ground, no base current is supplied to either transistor 957 or 958. Therefore current is supplied through resistors 961 and 962 to the base of transistor 959 which thereby conducts, holding its output at ground. Similarly, if both inverters have outputs at negative supply voltage, both the bases and emitters of both transistor 957 and 958 are at supply voltage, and again no collector current can flow, allowing transistor 959 to conduct. If, however, one inverter is on and the other is off, the base of transistor 958 or 957 will be supplied current through resistors 963 or 964 respectively, and the emitter will be held at ground. This will cause collector current to flow through resistor 961, removing the base current from transistor 959. If there were no further circuitry at this point, the collector of transistor 959 would rise to the supply voltage whenever the scale amplifier-rectifier signal were between the two reference levels.

It is, however necessary to provide for reading of the scale output at the proper time. The collector of transistor 967 is therefore connected to the collector of transistor 959 and is biased on through resistor 968. Capacitor 969 connected to the base of transistor 967 is connected to the read delay signal. The signal is differentiated by capacitor 969 and resistor 968. At the start of the read delay, this signal goes negative, and extra base current is supplied to transistor 967. At the end of the delay, when the signal returns to ground, the base of transistor 967 is reversed biased until capacitor 969 can discharge through resistor 968. During this time, transistor 967 is turned off. If at this time transistor 959 is also turned off, the output of transistor 959 rises toward supply voltage, and current is supplied to transistor 970 through resistor 971, turning transistor 970 on.

Transistors 970 and 972 and associated components comprise a timer circuit 554, in all respects substantially identical to the read pulse generator 530. This timer provides the delay before the accept solenoid 460 is actuated. Suffice it to say, resistor 973 is the collector load and resistor 974 is the bias resistor for transistor 970 with diode 975 serving as a filter. Resistor 976 is the collector load for transistor 972 while resistor 977 its bias. Resistor 978 is interposed as a feedback resistor. When transistor 970 is on, capacitor 979 is permitted to discharge through resistor 977 and reject delay potentiometer 948'. When transistor 970 is turned on, transistor 972 is turned off, thereby actuating the accept timer 556.

Thus, capacitor 980 will charge through resistors 976 and 980 and the base of transistor 982 which is biased on through resistor 983 and the reject time potentiometer 984 (not on card); and resistor 985 serves as its collector load. After the delay time, the collector of transistor 972 returns to ground potential, and the base of transistor 982 is reverse biased, turning off transistor 982 until capacitor 980 discharges through resistor 983 and the reject time potentiometer 984. When transistor 982 is off, base current is supplied to transistor 986 through resistor 985 and diode 987, the coupling diode, turning transistor 986 on, and energizing the "accept" solenoid 460. Diode 988 protects transistor 986 from inductive surge voltages when the solenoid is de-energized, whereas resistor 989 provides the bias.

Diode 990, on the other hand, couples the output of transistor 986 to the "accept" indicator light 991 (not on card) on the front panel, and to a second light 992 on the chassis, which indicates that the card is functioning.

Power supplies

When tapping into an A.C. power source, power is supplied by a transformer 990 with incoming power passing through, for example, a suitable connector 991, interference filter 992, as well as fuse and power-on indicator lamp network 993 to the primary winding 994. The transformer 990 has three secondary windings, each adapted to provide predetermined voltage to the electronic components connected thereto.

The transformer secondary 995 is coupled with a diode rectifier bridge 996 for supplying a rectifier voltage to energize the various solenoids. In general, the solenoids are operated in such a manner as to provide a large current to aid in pulling in the solenoid, and a small holding current.

Thus, the solenoids of the valve 418 have their power supplied from the rectifier 996 through resistors 997 and 998 and capacitor 999 serving as a filter together with capacitor 1000. When the solenoid valve is de-energized, the capacitor 1000 charges through resistor 998. When either side of the valve is energized, this capacitor discharges through it, causing a surge. Upon discharge of the capacitor 1000, the current passing through the solenoid is reduced, as compared to the pull-in current, by the resistor 998 by about two-thirds in one commercial application of the invention.

Similarly, the reject solenoid 460 has its power supplied through resistor 1001 and capacitor 1002. When this solenoid is in its de-energized state, the capacitor 1002 charges through resistor 1001; and when the solenoid is energized, the capacitor discharges through its windings.

The positive voltage supply is rectified by a rectifier diode 1003 connected to one side of secondary winding 1004 of transformer 990. The rectified voltage is passed through resistor 1005 and is regulated by diode 1006 and filtered by capacitor 1007.

The negative supply voltage includes three taps extending from transformer secondary winding 995. Thus, the power for the various lamps passes through resistor 1008, with resistor 1009 leading to ground accordingly is only partially filtered. In this connection, the load of the lamps on the filtered supplies would otherwise cause interference when the lamps are turned on.

The negative control voltage passes through resistor 1010 and is filtered by capacitor 1011.

The remaining negative supply voltage, termed the RCVR line, extends through resistors 1012 and 1013 and is filtered by capacitors 1014 and 1015 with the zener diode 1016 serving as the regulator.

There are two variable regulated voltage sources, used to supply power to the scale conveyor 280 and air or reject conveyor 36. These voltages are adjustable to provide variable speed operation of the motors and are regulated to maintain constant speed, once they have been adjusted. Each of these power supplies are substantially identical and for this reason only one will be described. They are both tapped into the secondary 1017 of transformer 990 through the diode rectifier circuit 1018, resistors 1019 and 1020, filter 1021 and switch 1022.

Referring to the power supply for the reject conveyor 36, it will be observed that a transistor regulator is included consisting of two cascaded emitter followers 1023 and 1024 having respective collector loads 1025 and 1026. In addition, the bias voltage passed through rectifier diode 1003, resistor 1027 and filtered by capacitor 1028 is connected to the transistor 1023 and 1024 through resistors 1029 and 1030 with diodes 1031 and 1032 and 1033 serving to further control this voltage. A potentiometer 1034 permits the utilization of a portion of the reference voltage and is connected between the junction of resistor 1035 and diode 1036 and the base of transistor 1023. Adjustment of potentiometer 1034 will obviously change the speed of the motor 446 of air conveyor 36.

*Operation*

Summarizing the operation of the cold cut line of the present invention, it will be recalled that several adjustments are initially made in order to produce a stack of sliced food product of a certain weight and number of slices. To this end, the counting mechanism, in the form of the selective gear transmission 108 is set to one of the three speed ratios for 6, 8 and 10 slice stacks. In this connection, the rod 248 is shifted by grasping knob 250 to shift the gear cluster on shaft 234 to the selected gear setting which is then locked in place by releasing the spring-biased pin 252 such that its projecting stud 254 is received by the appropriate bore 256. Upon completion of this adjustment, the stacker 32 will receive the selected number of slices on the slice receiving vanes 112 and 114 of the paddles 104 and 106 respectively, projecting from the Geneva transmission paddle box 110. When the selected number of slices has been deposited upon these vanes by the slicing machine 34, the Geneva drive 136 will reach that part of its rotational movement as imparted by worm 130 through the flexible drive shaft 107 at which time its projecting pin 138 will actuate the four-star disc 142 and through interposed gear train, flip the paddles 104 and 106 to deposit the accumulated stacked slices onto the receiving surface of the weigh conveyor 280; and simultaneously the paddles will present another pair of its slice receiving vanes 112 and 114 and stack the following slices without cessation of operation of the feeder 45 of the slicing machine 34.

Assuming that the product 44 to be sliced and stacked has been selected and proper adjustment is made in the relationship between the relative location of the paddles 104 and 106 and the slicing blade 46, it may now be necessary to adjust the effective orifice opening of the flow control valve 74 for purposes of changing the rate of feed of the feeder 45 towards the slicing blade 46 and consequently the slice thickness. Depending upon the prior setting of the corrector 75, the increase switch 62a or decrease switch 62b is actuated for purposes of either energizing the increase solenoid 420 or decrease solenoid 422 respectively of the double solenoid valve 418. Through the operation of the hydraulic piston 410 within cylinder 412 of this corrector 75, the wedge or cam shape actuator 404 is correspondingly shifted to displace the valve throttle 390 and accordingly change the size of the orifice opening of valve 376.

Accompanying the selection of the weight for a stack of slices of predetermined number, may be a change in the settings of the scale 288. The adjustment of the weight change potentiometer 603 serves to electrically shift the null of the system and its adjustment in effect establishes the weight for the stack of slices.

The potentiometer 812 is ordinarily preset to permit the reading of a stack of slices on the weight conveyor 280 at a predetermined time following the initial impact of the stack upon the weigh conveyor 280, the time interval being such that the weight of the stack is registered by the scale 288 while it is still upon the surfaces of the weigh conveyor 280.

The potentiometers 912 and 913 are set to determine the magnitude of the correction to be fed back to the corrector 75 for purposes of adjusting the rate of advance of the pusher 45, this being as indicated in the foregoing, usually in terms of a percentage of the actual error. The potentiometers 952 and 952' will be adjusted for purposes of establishing the permissible upper and lower limit of weight for stacks of sliced products that will not be rejected by the reject mechanism 38. The low reject potentiometer 952 will be set to prevent any underweights from passing through the reject mechanism, whereas the high reject potentiometer 952' will normally be set to provide for a one-quarter ounce tolerance before the reject solenoid is actuated.

The loaf 44 of food product to be sliced is placed on the bed of the slicing machine 34 such that it is firmly engaged by the disclosed pneumatic gripping means. Assuming that the slicing machine 34 is turned on through the actuation of switch 64 and the hydraulics thereof is set into operation by depressing the handle 58 of the control valve 59, the lever 63 is depressed to start the forward advance of the feeder 45 and consequently the loaf 44 of product to be sliced towards the slicing blade 46. The leading end of the loaf 44 will actuate the limit switch 538 immediately before the slicing blade 46 to enable the first stack counter 536 to disable the read pulse generator 530 by turning off the inhibit circuit 532 until 2 or 3 stacks are detected by the scale 288, depending upon the adjustment. In this connection, the adjustment is made by any one of four possible combinations of the two bistable circuits 841 and 863. The counter, as stated, is reset by the limit switch 538 as the feeder 45 reaches the end of its travel, which also has the effect of preventing the scale from reading the last two stacks of each loaf.

The stack of slices following the second or third stack of the loaf, as the case may be, will be deposited on the weigh conveyor 280 by the stacker 32 and registered by the scale 288. Upon expiration of the read time delay as determined by the adjustment of the potentiometer 812 and assuming no other inhibit signals are transmitted to the inhibit circuit 532, the read pulse generator 530 is triggered. This generator which includes transistors 780 and 782 produces a constant pulse to the vloatge time converter 542 where it is compared with the reference voltage and then applied to either transformer 889 or 888, depending upon whether the scale output indicated heavier or lighter respectively, than the reference. As a result of the parameters of the core and windings of these transformers, the extent of error is converted to a time pulse applied to one of the amplifiers 544 and 546 that drive the solenoid vale 418, depending upon the direction of the error.

If the stack of sliced product registered is outside of the prescribed weight, the solenoid valve 418 of the corrector 75 will be energized to move the piston 410 and cylinder 412 and consequently the actuator 404 to shift the throttle 390. Accordingly, the effective orifice opening of the flow control valve 74 will be adjusted with the result that the rate of advance of the feeder 45 towards the slicing blade 46 will be correspondingly changed.

Upon expiration of the read time delay, as established by circuit 528, the scale output is applied to the reject level sensor circuitry 552. This voltage signal is there compared with a reference voltage. If the scale output falls between the levels at which level sensing circuits are set to respond by potentiometers 952 and 952', the accept delay circuit 554 is triggered, which in turn actuates the accept time circuit 556 to eventually energize reject solenoid 460. Thus, the stack of sliced product having a weight within the prescribed tolerance is permitted uninterrupted passage on the air conveyor 36 to the packaging station 40. On the other hand, if the scale amplifier-rectifier output is not within the limits of the two level sensing circuits 552, the solenoid 460 will not be actuated, and the incorrect stack will be pushed aside on the air conveyor 36 so that proper weight can be made.

The slicing operation will then continue normally and the above cycles repeated until the loaf 44 has been consumed.

It will be readily apparent that at an average speed of 800 r.p.m. for the slicing machine 34, production of 800 slices per minute or 3000 pounds per hour are realized. Commercial applications of this invention have produced 8 slice groups at a rate of 90 per minute. With a suggested tolerance of 0 to ¼ ounce over the desired weight of package, about 82% of the groups were within the prescribed limits. Quite obviously, the number of slices per group, the weight and the tolerance are all easily adjusted. The crew required for the contemplated output majority consist of a slicing machine operator, one operator to check-weigh rejected stacks and assist in loading the pouch conveyor 476, one operator for full-time feeding of this conveyor, one operator at the entrance of the wrapping unit 470 to check that feed is straight and uniform, and one or two operators to pack off.

Assuming a production capacity per cold cut line of 3000 pounds per hour and allowing for about 70% actual production time, an actual production of 2100 pounds per hour, will for a six operator crew result in an output of 350 pounds per operator hour. Above all, labor and space requirements are minimized for a given volume of production, and at the same time, reduced give-away to an average of less than ⅛ ounce per package with absolute assurance against underweights.

Thus, the several aforenoted objects and advantages, among others implicit and incidental to the present invention are most effectively attained. It should be understood, however, that this invention is in no sense limited by the disclosed, but is to be determined by the scope of the appended claims.

I claim:

1. In combination with a slicing machine having a slicing blade, a reciprocal feeder for continuously feeding a product to be sliced into said blade, control means for determining the rate of advance of said feeder towards said slicing blade and, consequently, the slice thickness, a stacker at the discharge end of said slicing machine of a preselected number of slices of said product as they are discharged by said slicing machine, slice-counting means for determining the preselected number of slices discharged by the slicing machine, and a stacker actuating means coupled with both said stack and said counting means for actuating said stack to transfer the stack of preselected number of slices of said product and ready said stacker for reception of another stack of slices, the improvement of; weigh-while-conveying apparatus for receiving directly the stacks of sliced product deposited by said stacker and registering their weight, feedback means operatively connected with said weigh-while-convey apparatus and coupled with said control means of said slicing machine for feeding back signals to such control means corresponding to the weight differential over and below the prescribed weight for the preselected number of slices to thereby correct the adjustment of said control means of said slicing machine in a minimum period of time following the registration of the weight differential to respectively decrease and increase the rate of advance of said feeder and, consequently, decrease and increase, respectively, the slice thickness; transfer means adjacent the weigh-while-convey apparatus for carrying away the stacks of sliced product; reject means operatively connected with said weigh-while-conveying apparatus for rejecting those stacks that are underweight and counting means for actuating said reject means for automatically rejecting a preset number of stacks first sliced from the product to be sliced that are of other than the prescribed weight.

2. The invention in accordance with claim 1 wherein said transfer means comprises an air conveyor on which the stacks of sliced product are adapted to travel, said air conveyor including a source of air flow, a plate having an upper face and openings therein through which the air flow is adapted to emerge, and conduit means connecting said source of air flow with said plate such that air emerging from the upper face of said plate through its openings presents a substantially frictionless layer on which the stacks of sliced product travel.

3. The invention in accordance with claim 2 wherein said openings are at an angle with the upper face of said plate in the direction of travel of the stacks of sliced product away from said weigh-while-convey apparatus such that the air flow from said plate forces said stacks toward the traveling end of said air conveyor away from said weigh-while-convey apparatus.

4. The invention in accordance with claim 2 wherein said reject means is located on said air conveyor.

5. The invention in accordance with claim 1 wherein said reject means is on said transfer means and comprises a pusher plate, a rotary solenoid and connecting means operatively connecting said pusher plate with said rotary solenoid such that, upon energization of said solenoid, said pusher plate is elevated and stacks of sliced product within the prescribed weight limits will be permitted free travel on said transfer means and, upon de-energization of said solenoid, said pusher plate is lowered and the stacks of sliced product outside the prescribed weight limits will be pushed aside so that they are readily detected.

6. The invention in accordance with claim 5 wherein control means are operatively connected between said solenoid and said weigh-while-convey means for actuating said solenoid when a stack of slices is registered by said weigh-while-convey means within the prescribed weight limits.

References Cited by the Examiner

UNITED STATES PATENTS

| | | | |
|---|---|---|---|
| 662,574 | 11/00 | McGary. | |
| 1,900,781 | 3/33 | Wardley. | |
| 2,812,792 | 11/57 | Allbright | 146—94 X |
| 2,903,032 | 9/59 | Cervene | 146—94 |
| 2,938,626 | 5/60 | Dahms | 209—121 |
| 2,969,099 | 1/61 | Gillman | 146—94 |
| 2,989,104 | 6/61 | Good | 146—94 |
| 3,010,499 | 11/61 | Dahms et al. | 146—94 |
| 3,017,026 | 1/62 | Thompson | 209—121 |

J. SPENCER OVERHOLSER, *Primary Examiner.*

LOUIS J. CAPOZI, CARL W. ROBINSON, JOHN C. CHRISTIE, *Examiner.*